United States Patent
Brodt

(10) Patent No.: US 12,424,033 B2
(45) Date of Patent: Sep. 23, 2025

(54) METHOD AND DEVICE FOR RECORDING EVENT DATA IN A VEHICLE

(71) Applicant: Robert Bosch GmbH, Stuttgart (DE)

(72) Inventor: Andreas Markus Brodt, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 377 days.

(21) Appl. No.: 18/024,580

(22) PCT Filed: Sep. 7, 2021

(86) PCT No.: PCT/EP2021/074589
§ 371 (c)(1),
(2) Date: Mar. 3, 2023

(87) PCT Pub. No.: WO2022/063568
PCT Pub. Date: Mar. 31, 2022

(65) Prior Publication Data
US 2023/0326260 A1    Oct. 12, 2023

(30) Foreign Application Priority Data
Sep. 28, 2020    (DE) .................... 10 2020 212 148.6

(51) Int. Cl.
*G07C 5/00* (2006.01)
*G07C 5/08* (2006.01)

(52) U.S. Cl.
CPC ........... *G07C 5/008* (2013.01); *G07C 5/0841* (2013.01)

(58) Field of Classification Search
CPC ...... G07C 5/008; G07C 5/0841; G07C 5/085; H04L 12/40039
See application file for complete search history.

(56) References Cited

U.S. PATENT DOCUMENTS

2020/0210336 A1    7/2020    Bräutigam et al.
2023/0316756 A1*   10/2023   Wang .................... G06V 20/35
                                                          382/128

FOREIGN PATENT DOCUMENTS

DE    102008010628 A1    8/2009

OTHER PUBLICATIONS

International Search Report for PCT/EP2021/074589, Issued Dec. 22, 2021.

* cited by examiner

*Primary Examiner* — William Spieler
(74) *Attorney, Agent, or Firm* — NORTON ROSE FULBRIGHT US LLP

(57) ABSTRACT

A method for recording event data in a vehicle. Vehicle data are received continuously from at least one vehicle system and are written as event data in data frames of a predetermined size. The individual data frames are stored in at least one volatile memory. The stored data frames are managed and kept available in the at least one volatile memory until the event data stored in the individual data frames are older than a predetermined maximum pre-event point in time, or are stored persistently in at least one non-volatile memory in reaction to a recognized predetermined event. At least one partition of a predetermined size is provided, into which the received reference information of the individual data frames is written in any time sequence. Temporally randomly-sorted subsequences of the written reference information of the individual data frames in the at least one partition are ascertained and marked.

27 Claims, 4 Drawing Sheets

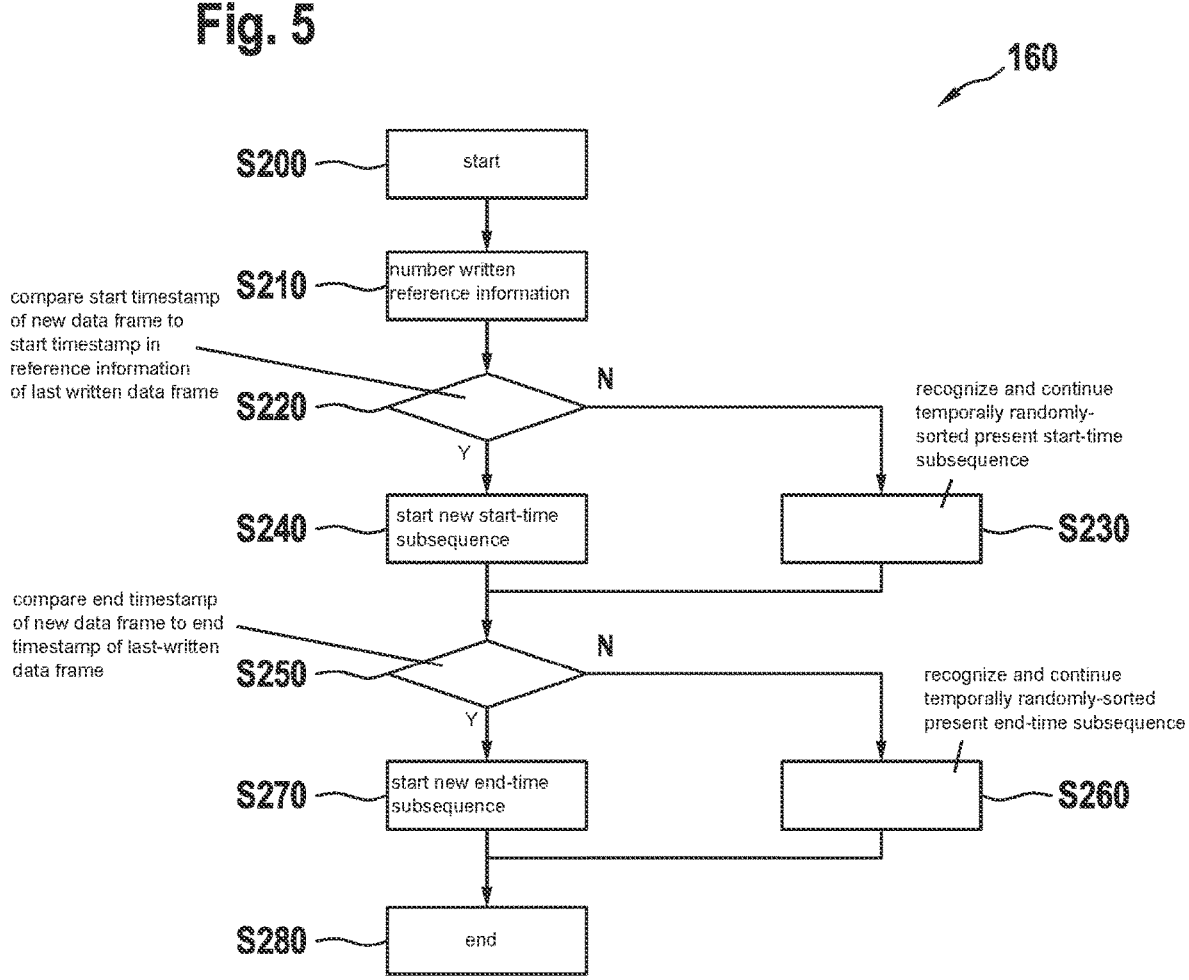

METHOD AND DEVICE FOR RECORDING EVENT DATA IN A VEHICLE

FIELD

The present invention relates to a method for recording event data in a vehicle. The present invention also includes a device and a computer-program product for carrying out such a method for recording event data in a vehicle as well as a machine-readable storage medium on which the computer-program product is stored.

BACKGROUND INFORMATION

Highly-automated driving augurs safer traffic because of the lack of human error. At the same time, it increases the need for data acquisition in such vehicles having highly-automated driving functions in the event that something goes wrong, so that all necessary information is available for later analyses and product improvements. Therefore, methods are used to record event data in such vehicles. In doing so, vehicle data is received continuously from at least one vehicle system and is written as event data in data frames of a predetermined size, the individual data frames being stored in at least one volatile memory. The stored data frames are managed and kept available in the at least one volatile memory until the event data stored in the individual data frames is older than a predetermined maximum pre-event point in time, or is stored persistently in at least one non-volatile memory in reaction to a recognized predetermined event. A device for carrying out such a method for recording event data usually includes a data-provision assembly, an event-recognition assembly and a data-recording assembly.

SUMMARY

A method for recording event data in a vehicle having features of the present invention may have the advantage that the reference information of the individual data frames within a partition is not sorted, but rather is stored in the order of its arrival timewise. The reference information of the individual data frames, that is, the individual data frames, may arrive in any time sequence. In this connection, data frames may originate from various data sources in the vehicle, which transmit the data via a vehicle network, for example. Therefore, data frames may mutually overtake each other in the data provision. Generally, however, it is very likely that the data frames arrive roughly sorted. This is by no means guaranteed, however. Therefore, although the sequence of the data frames is haphazard, a certain measure of random order may be assumed.

That means that embodiments of the present invention assume that the sequence of the data frames is not completely random, but rather is sorted to a certain extent with a few exceptions. The method of the present invention for recording event data in a vehicle utilizes this by noting randomly sorted subsequences within a partition, which later facilitates the search for data frames that are to be stored persistently in at least one non-volatile memory.

In specific embodiments of the method of the present invention for recording event data in a vehicle, the data frames are not sorted because during most trips, no event occurs for which vehicle data is stored persistently in the at least one non-volatile memory. That means that for the majority of driving time, the data frames are kept available in at least one volatile memory only for a specific period of time and are discarded again when the event data stored in the individual data frames is older than a predetermined maximum pre-event point in time. Therefore, in the normal case, sorting the reference information of the individual data frames within the partition in terms of time would only be unnecessary work. In addition, the sorting of the data frames would lead to non-uniform execution times, even with the use of expanded sorting techniques.

Specific embodiments of the present invention provide a method for recording event data in a vehicle, in which vehicle data is received continuously from at least one vehicle system and written as event data in data frames of a predetermined size. The individual data frames are stored in at least one volatile memory, the stored data frames being managed and kept available in the at least one volatile memory until the event data stored in the individual data frames is older than a predetermined maximum pre-event point in time, or is stored persistently in at least one non-volatile memory in reaction to a recognized predetermined event. In this context, at least one partition of a predetermined size is provided, into which the received reference information of the individual data frames is written in any time sequence, temporally randomly-sorted subsequences of the written reference information of the individual data frames in the at least one partition being ascertained and marked.

In addition, according to an example embodiment of the present invention, a device is provided for carrying out such a method for recording event data in a vehicle, the device including a data-provision assembly, a buffer block, an event-recognition assembly and a data-recording assembly. The data-provision assembly is designed to continuously receive vehicle data to be recorded from at least one vehicle system and to write it as event data in data frames of a predetermined size and to store the individual data frames in at least one volatile memory. The buffer block is designed to manage the stored data frames and to keep them available in the at least one volatile memory until the event data stored in the individual data frames is older than a predetermined maximum pre-event point in time, or is stored persistently in at least one non-volatile memory in reaction to a predetermined event recognized by the event-recognition assembly. The buffer block here includes a write function and at least one partition of a predetermined size, the write function being designed to write the received reference information of the individual data frames in any time sequence into the at least one partition, and to ascertain and mark temporally randomly-sorted subsequences of the written reference information of the individual data frames in the at least one partition.

According to an example embodiment of the present invention, also advantageous is a computer-program product having program code, which is stored on a machine-readable carrier such as a semiconductor memory, a hard disk memory or an optical memory and is used to carry out the evaluation when the computer program is executed.

Measures and further developments of the present invention disclosed herein permit advantageous improvements to the general method of the present invention, for recording event data in a vehicle, and to the device for recording event data in a vehicle.

In the present case, the data-provision assembly may be understood to be a processing component which includes all processing steps from the acquisition of the original vehicle data up to the organization and storage of the vehicle data as event data in volatile memory blocks, so that the event data may be kept available in the at least one volatile memory for a limited period of time. The event-recognition assembly in the present case may be understood to be a processing component which continuously monitors the state of the vehicle and decides when a pre-configured situation or a predetermined event has occurred which calls for the long-term storage of predetermined vehicle data. For example, such a predetermined event may be a recognized malfunction of one of the vehicle systems or a recognized impact of the vehicle on a fixed obstacle or another vehicle. The data-recording assembly in the present case may be understood to be a processing component which includes the processing steps in order to retrieve the vehicle data available in the at least one volatile memory, to possibly carry out further data transformations such as an encryption, for example, and finally to store the vehicle data persistently in at least one non-volatile memory.

To that end, according to an example embodiment of the present invention, the data-provision assembly, the event-recognition assembly and the data-recording assembly may each have at least one interface, which may be implemented in hardware and/or software. If implemented in hardware, the at least one interface may be part of what is referred to as a system ASIC, for example, that includes a wide variety of functions of the data-provision assembly. However, it is also possible that the interfaces are separate integrated circuits or are made up at least partially of discrete components. If implemented in software, the interfaces may be software modules which are present in a microcontroller, for example, in addition to other software modules.

Via the at least one interface, the data-provision assembly is able to receive the vehicle data to be recorded from the at least one vehicle system which, for example, may take the form of a driving-environment sensing system or a personal-protection system or a driving-dynamics system or a braking system. Moreover, the data-provision assembly may be connected via at least one interface to the at least one volatile memory in order to keep the received vehicle data available for a limited period of time in the at least one volatile memory. In addition, the data-provision assembly may include further components for conditioning and pre-processing the received vehicle data. The event-recognition assembly may receive vehicle data or information from the at least one vehicle system via the at least one interface and evaluate the received vehicle data or information in order to recognize relevant events. Thus, for example, the data-provision assembly and the event-recognition assembly may each be coupled to a vehicle data bus, so that the data-provision assembly and the event-recognition assembly, respectively, are able to receive vehicle data and information from a variety of vehicle systems which are connected to the vehicle data bus.

According to an example embodiment of the present invention, the data-recording assembly may be connected via the at least one interface to the at least one volatile memory, in order to read out the data to be stored persistently. In addition, the data-recording assembly may be connected via the at least one interface to the at least one non-volatile memory, in order to store the data to be stored persistently in the at least one non-volatile memory.

The buffer block in the present case may be understood to be a component which produces the connection between the data-provision assembly, the event-recognition assembly and the data-recording assembly. In this context, the buffer block maintains the vehicle data, made available by the data-provision assembly, in the at least one volatile memory until the data is too old to be relevant for an event. In this case, the buffer block frees the memory area which is used in the at least one volatile memory for the now aged vehicle data, so that this memory area may be reused by the data-provision assembly to store newer vehicle data. Alternatively, the event-recognition assembly notifies the buffer block that all vehicle data from a certain acquisition time window is to be made available to the data-recording assembly. In this case, the buffer block ensures that all vehicle data of the predetermined present event time window remains available until the data-recording assembly has completely stored this vehicle data persistently in the at least one non-volatile memory. This also includes the borderline case where the data-recording assembly stores the vehicle data so slowly that in the meantime, the vehicle data is obsolete for newer events. Even then, the buffer block may not free or overwrite the corresponding memory area in the at least one volatile memory.

According to an example embodiment of the present invention, the data-provision assembly, the event-recognition assembly and the data-recording assembly may be distributed over several components in the vehicle, which are interconnected via a suitable vehicle network infrastructure. For example, the data-provision assembly may be implemented on several "data sources" such as computer units, for instance, which are able to pass on the vehicle data to other devices in the vehicle that may carry out the event recognition and further post-processing steps and may include the buffer block, while other post-processing steps and the data storage may be carried out in a further computer unit. The data provision, event recognition and data recording may be carried out in separate operational sequences. In addition, the device or hardware on which the method for recording event data in a vehicle is executed may provide several CPU cores or several processors which are able to actually execute these operational sequences in parallel. The buffer block is able to separate calls by the data-recording assembly, the event-recognition assembly and the data-provision assembly from each other, so that the results in each parallel execution are always correct. Moreover, the data-provision assembly is able to invoke the buffer block in several parallel operational sequences. The data-recording is carried out in a single operational sequence, that is, the buffer block does not have to separate any individual calls of the data-recording assembly from one another. The interface processes which the buffer block provides are invoked by the interface components and thus run in their respective operational sequences.

According to an example embodiment of the present invention, it is particularly advantageous that in reaction to a request and as a function of at least one predetermined read criterion, that includes at least one present event time window for which the event data is to be recorded persistently, reference information of data frames which is contained in the at least one partition and includes event data to be recorded persistently may be read out and passed on. The data frames corresponding to the forwarded reference information may be stored persistently in the at least one non-volatile memory.

In advantageous refinement of the method of the present invention, a start time of the present event time window may be predetermined as timestamp in relation to a present zero reference time. An end time of the present event time window may be predetermined as time difference with respect to the start time, the present zero reference time being able to be redefined, if necessary. A first zero reference time may correspond here to a start time of the vehicle. The method for recording event data in a vehicle must deal with no event prior in time to the beginning of the present trip.

Therefore, the zero reference time also must not be prior to the beginning of the trip. For example, the present zero reference time may be redefined if a new present event time window is not able to be represented with the present zero reference time, because the start time of the new present event time window is too distant in time from the present zero reference time. A time window may usually be represented as two absolute points in time, that is, as two timestamps, a start timestamp and an end timestamp. 32 bits are necessary to represent such a timestamp, so that 64 bits are needed to represent a time window. A 32-bit processor is only able to read or write 32 bits atomically, that is, in one machine instruction, therefore 64 bits require more than one machine instruction, which is not atomic. In order to represent the present event time window in 32 bits and therefore to provide a blocking-free atomic implementation of the present event time window, instead of using two timestamps to define the present event time window, a start timestamp is used for the start time and a time difference in relation to the start time or the start timestamp is used for the end time. The length of the present event time window will lie probably in the order of minutes. Therefore, instead of storing two complete timestamps for the start time and the end time of the present event time window, it is possible to save on bits by storing only the start timestamp of the present event time window and the duration of the event window. Thus, for example, using a 32-bit processor, the present event time window may be read or stored at a resolution of 0.1 s with 17 bits for the start timestamp and with 14 bits for the duration or length of the present event time window, with one atomic machine instruction. In this connection, for example, the start time of the present event time window may be expressed up to a maximum value of 3.6 hours after the present zero reference time, and the duration or length of the present event time window may be expressed up to a maximum value of 27.3 minutes or 1,638 seconds.

In further advantageous development of the method of the present invention, the individual data frames may pertain to one time window. In this context, the reference information of the individual data frames may in each case include a corresponding memory area and the corresponding time window with a start timestamp and an end timestamp of the individual data frames, in which at least one data segment of the event data contained in the corresponding data frame was generated or acquired. It is thereby possible to check easily and quickly whether the data frame contains event data or vehicle data whose generation or acquisition overlaps with the present event time window. In addition, the start timestamp and the end timestamp of the individual data frames may be related to the present zero reference time.

In further advantageous refinement of the method of the present invention, a time window may be assigned to the at least one partition. In this case, as start timestamp of the time window of a corresponding partition, an oldest start timestamp of reference information of a corresponding data frame contained in the partition may be used. As end timestamp of the time window of the corresponding partition, a latest end timestamp of reference information of a corresponding data frame contained in the partition may be used. It is thus possible to check easily and quickly whether the corresponding partition overlaps with the present event time window.

In another advantageous development of the method of the present invention, the reference information of at least one data frame, whose time window overlaps with the present event time window, may be read out from the at least one partition. In addition, the time window of the at least one data frame may be made invalid in the reference information after the reference information has been read out. It is thus possible to prevent the reference information of a data frame from being read out multiple times, and the corresponding data frame from being stored persistently several times in the at least one non-volatile memory.

In further advantageous development of the method of the present invention, the written reference information of the individual data frames may be numbered consecutively in ascending order according to its write sequence. In this case, upon each writing of reference information of a new data frame, the time window of the new data frame may be compared to the time window of the data frame whose reference information was written previously as the last into the write partition.

For example, in a further advantageous refinement of the method of the present invention, the start timestamp of the new data frame may be compared to the start timestamp of the last-written data frame, in doing so, a temporally randomly-sorted present start-time subsequence may be recognized and continued, if the start timestamp of the new data frame is later than the start timestamp of the last-written data frame. Alternatively, a new start-time subsequence may be started and its start timestamp may be marked by storing the corresponding numbering of the new data frame, if the start timestamp of the new data frame is older than the start timestamp of the last-written data frame. In addition, a first start-time subsequence may start with the start timestamp of the first-written data frame. In other words, the lowest number of the ascending numbering simultaneously marks the start of the first, temporally randomly-sorted, present start-time subsequence. Additionally or alternatively, the end timestamp of the new data frame may be compared to the end timestamp of the last-written data frame, in doing so, a temporally randomly-sorted present end-time subsequence being recognized and continued, if the end timestamp of the new data frame is later than the end timestamp of the last-written data frame. Alternatively, a new end-time subsequence may be started and its end timestamp may be marked by storing the corresponding numbering of the new data frame, if the end timestamp of the new data frame is older than the end timestamp of the last-written data frame. In addition, a first end-time subsequence may start with the end timestamp of the first-written data frame. In other words, the lowest number of the ascending numbering simultaneously marks the start of the first, temporally randomly-sorted, present end-time subsequence. This may seem complex, but the number of timestamp comparisons upon readout is markedly less in comparison to running through all data frames of a partition and checking their start timestamp and their end timestamp.

In further advantageous refinement of the method of the present invention, reference information of at least one data frame to be read out from the at least one partition may be ascertained as a function of the temporal relation of the at least one temporally randomly-sorted start-time subsequence and/or the at least one temporally randomly-sorted end-time subsequence of the present read partition, to the present event time window. The introduction of the temporally randomly-sorted start-time subsequences and the temporally randomly-sorted end-time subsequences is able to accelerate the discovery of reference information of data frames to be read out, since the reference information of all data frames contained in the present read partition does not always have to be checked.

In further advantageous development of the method of the present invention, in order to ascertain reference information of data frames to be read out from the at least one partition, the end timestamps of the marked, temporally randomly-sorted end-time subsequences may be compared to the start time of the present event time window, if the start timestamp of the time window of the at least one partition lies outside of the present event time window and the end timestamp of the time window of the at least one partition lies within the present event time window. In this case, the at least one partition begins prior to the present event time window. Therefore, the at least one partition contains data frames which are too old for the present event time window, but no data frames which are too recent for the present event time window. It is thus sufficient to compare only the end timestamp of the individual data frames to the start time of the present event time window. Utilizing the marked, temporally randomly-sorted end-time subsequences, beginning with the final value of a first end-time subsequence, the end timestamp of the corresponding data frame is compared to the start time of the present event time window. This comparison is repeated for the next entry of the first end-time subsequence up to the initial value of the first end-time subsequence. The comparison is repeated until the end timestamp of the data frame presently being checked is prior in time to the start time of the present event time window or the initial value of the first end-time subsequence has been checked. Based on the sorting properties of the end-time subsequences, all other data frames "further to the left" are ended even earlier and therefore do not have to be taken into account. Once the first end-time subsequence has been checked, a jump is made to the final value of the next end-time subsequence and the comparison process starts from the beginning until all end-time subsequences of the at least one partition have been checked.

If the time window of the at least one partition lies completely within the present event time window, reference information of all data frames in the at least one partition may be read out. If the time window of the at least one partition is located completely within the present event time window, no timestamps are compared.

If the start timestamp of the time window of the at least one partition lies within the present event time window and the end timestamp of the time window of the at least one partition lies outside of the present event time window, in order to ascertain reference information of data frames to be read out from the at least one partition, the start timestamps of the marked, temporally randomly-sorted start-time subsequences may be compared to the end time of the present event time window. In this case, the at least one partition contains no data frames which are too old. Therefore, only the start timestamp of the individual data frames is compared to the end time of the present event time window, in order to ensure that the data frames do not lie completely after the present event time window in terms of time. Utilizing the marked, temporally randomly-sorted start-time subsequences, beginning with the initial value of a first start-time subsequence, the start timestamp of the corresponding data frame is compared to the end time of the present event time window. This comparison is repeated for the next entry of the first start-time subsequence up to the final value of the first start-time subsequence. The comparison is repeated until the start timestamp of the present checked data frame lies after the end time of the present event time window or the final value of the first start-time subsequence has been checked. Based on the sorting properties of the start-time subsequences, all other data frames "further to the right" are started even later and therefore do not have to be taken into account. Once the first start-time subsequence has been checked, a jump is made to the initial value of the next start-time subsequence and the comparison process starts from the beginning, until all start-time subsequences of the at least one partition have been checked.

In addition, according to an example embodiment of the present invention, in order to ascertain reference information of data frames to be read out from the at least one partition, the start timestamps of the marked, temporally randomly-sorted start-time subsequences may each be compared to the end time of the present event time window, and the end timestamps of the marked, temporally randomly-sorted end-time subsequences may be compared to the start time of the present event time window, if the start timestamp of the time window of the at least one partition is older than the start time of the present event time window and the end timestamp of the time window of the at least one partition is later than the end time of the present event time window. In this case, the at least one partition contains both data frames which begin before the present event time window and data frames which end after the present event time window. Therefore, both the start timestamp and the end timestamp of the data frames are checked. To that end, the start-time subsequences and the end-time subsequences are utilized to accelerate the ascertainment of the data frames to be read out.

In further advantageous refinement of the method of the present invention, multiple partitions of a predetermined size may be provided. In this case, as a function of at least one write criterion, one of the partitions is determined as present write partition into which the received reference information of the individual data frames is written. In reaction to the request and as a function of the at least one predetermined read criterion, one of the other partitions may be determined as present read partition from which contained reference information of data frames that includes event data to be recorded persistently is read out and forwarded. In this case, the present write partition may be marked by a write-partition pointer and the present read partition may be marked by a read-partition pointer. The single present write partition, which only one function is able to access exclusively, advantageously prevents other functions from being able to access the present write partition and alter its data contents. The same holds true for the single read partition, which only one function is able to access exclusively, so that no other functions are able to access the present read partition and alter its data contents.

In further advantageous development of the method of the present invention, prior to determining the present read partition, the existing present event time window may be stored locally. In this case, prior to each read-out operation of the reference information of at least one data frame, the locally-stored present event time window may be compared to the present event time window, and the present event time window may be stored locally if it differs from the locally-stored present event time window. In addition, it may be checked whether the time window of the present read partition and the new present event time window overlap each other, if the locally-stored present event time window was changed. The read-out operation of the read partition may be restarted if the present read partition overlaps with the changed present event time window. In other words, the present read partition is read again from the beginning. In doing so, reference information already read out is not read out again, since the time window of the corresponding data frame was made invalid in the reference information after the reference information was read out. Alternatively, a new present read partition may be determined if the present read partition does not overlap with the changed present event time window. This means that the read-out operation of the present read partition which corresponds to the present event time window that in the meantime has become antiquated, is aborted and is not restarted. In this way, at the most, reference information of one data frame, whose time window is now outside of the new present event time window, is forwarded to the data-recording assembly. However, this behavior is as though the event-recognition assembly had first determined the new present event time window after the read-out operation had read out the reference information of this data frame, and is therefore tolerable.

In another advantageous refinement of the method of the present invention, as a function of the at least one predetermined write criterion, a new write partition may be sought when the vehicle is restarted or the present write partition is completely written with reference information. To that end, for example, a set of partitions may be determined which have no valid time window. That means that these partitions contain no reference information of data frames, so that no conflict is able to be created between the determination of the present write partition and the determination of the present read partition. Since these partitions contain no reference information of data frames, neither is it attempted to use these partitions as present read partitions. Therefore, one of these partitions may be determined as present write partition. Additionally or alternatively, partitions may be determined which have a valid time window that is completely older than the maximum pre-event point in time and does not overlap an existing present event time window. This means that no event which may occur in the future still needs the data frames of the respective partition, and that at present the partition is also not relevant as read partition, and all reference information of data frames which overlap the present event time window is not yet completely read out, even if they already extend beyond the maximum pre-event point in time. From this set of partitions, one partition which has no valid time window, or one partition whose corresponding valid time window has the oldest start timestamp may be determined as present write partition. In addition, prior to determining the present write partition, the existing present event time window may be stored locally. Thus, before determining the present write partition, it may be checked whether the present event time window has changed. When the new present write partition is determined, the write-partition pointer may be reset according to an atomic machine instruction.

In advantageous embodiment of the device of the present invention, the buffer block may include a read function which is designed, in reaction to a request of the data-recording assembly and as a function of at least one predetermined read criterion, that includes at least one present event time window for which the event data is to be persistently recorded, to read out the reference information of data frames which is contained in the at least one partition and includes event data to be recorded, and to forward it to the data-recording assembly. The data-recording assembly may be designed to store the data frames, corresponding to the forwarded reference information, persistently in the at least one non-volatile memory.

In further advantageous development of the device of the present invention, the buffer block may include multiple partitions of a predetermined size, the write function further being able to be designed, depending on the at least one write criterion, to determine one of the partitions as present write partition, into which the reference information of the individual data frames received from the data-provision assembly is written. The read function may further be designed, in reaction to the request of the data-recording assembly and depending on the at least one predetermined read criterion, to determine one of the other partitions as present read partition, from which contained reference information of data frames is read out and passed on to the data-recording assembly.

In another advantageous refinement of the device of the present invention, the event-recognition assembly may be designed to continually monitor the state of the vehicle and to decide when a predetermined event has occurred which requires the persistent storage of the corresponding event data of the at least one vehicle system. In this context, the event-recognition assembly may further be designed to output to the buffer block, the present event time window corresponding to the recognized event and for which the event data is to be persistently recorded, a start time of the present event time window not being prior in time to the maximum pre-event point in time. In addition, the event-recognition assembly may further be designed to predetermine the start time of the present event time window as timestamp in relation to a present zero reference time and an end time of the present event time window as time difference with respect to the start time, the buffer block being able to be designed to redefine the present zero reference time, if necessary.

Exemplary embodiments of the present invention are represented in the figures and explained in greater detail in the following description. Identical reference numerals in the figures designate components or elements which perform the same or analogous functions.

BRIEF DESCRIPTION OF THE DRAWINGS

FIG. 4 shows a tabular representation of a memory area during a redefinition of a present zero reference time for the method according to the present invention for recording event data in a vehicle from FIG. 1.

FIG. 5 shows a schematic flow chart of a process for determining and marking temporally randomly-sorted subsequences for the method of the present invention for recording event data in a vehicle from FIG. 1.

DETAILED DESCRIPTION OF EXAMPLE EMBODIMENTS

Figure 1:
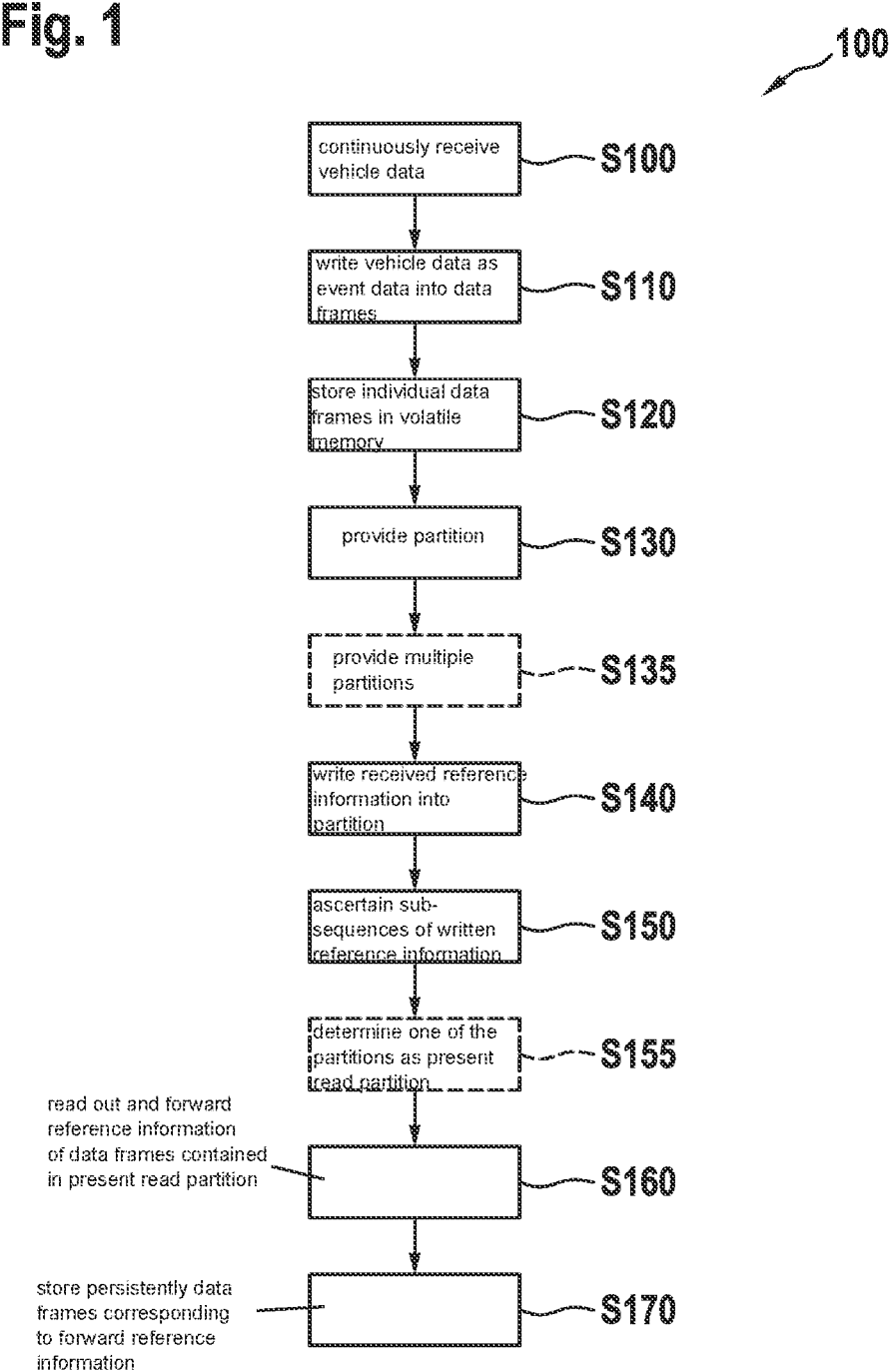
FIG. 1 shows a schematic flow chart of an exemplary embodiment of a method according to the present invention for recording event data in a vehicle.

As can be seen from FIG. 1, in the exemplary embodiment of a method 100 according to the present invention shown for recording event data in a vehicle, in a step S100, vehicle data is received continuously from at least one vehicle system 3, and in step S110, is written as event data into data frames DR of a predetermined size. In step S120, the individual data frames DR are stored in at least one volatile memory 50, stored data frames DR being managed and kept available in the at least one volatile memory 50 until the event data stored in individual data frames DR is older than a predetermined maximum pre-event point in time, or is stored persistently in at least one non-volatile memory 46 in reaction to a recognized predetermined event. To that end, in step S130, at least one partition 21 of a predetermined size is provided, into which in step S140, received reference information 25 of individual data frames DR is written in any time sequence. In step S150, temporally randomly-sorted subsequences of written reference information 25 of individual data frames DR in the at least one partition 21 are ascertained and marked.

Figure 3:
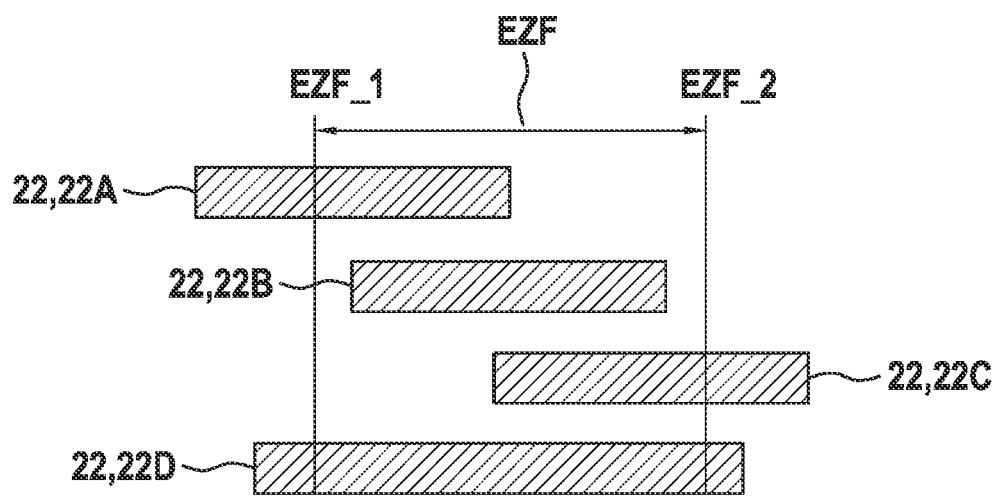
FIG. 3 shows a schematic representation of a first exemplary embodiment of a present event time window and several exemplary embodiments of partition time windows for the method according to the present invention for recording event data in a vehicle from FIG. 1.

In the exemplary embodiment of method 100 according to the invention shown, in step S160, in reaction to a request and as a function of at least one predetermined read criterion, that includes at least one present event time window EZF shown in FIG. 3 for which the event data is to be recorded persistently, reference information 25 of data frames DR that is contained in the at least one partition 21 and that includes event data to be recorded persistently is read out and passed on. In step S170, data frames DR corresponding to forwarded reference information 25 are stored persistently in the at least one non-volatile memory 46.

In the exemplary embodiment of method 100 according to the invention shown, in step S130, multiple partitions 21 of a predetermined size are provided, and in an optional step S135 depicted with dashed lines, depending on at least one write criterion, one of partitions 21 is determined as present write partition, into which received reference information 25 of individual data frames DR is written in step S140. In addition, in an optional step S155 depicted with dashed lines, in reaction to a request and as a function of at least one predetermined read criterion, which includes at least present event time window EZF for which the event data is to be persistently recorded, one of the other partitions 21 is determined as present read partition. In step S160, reference information 25 of data frames DR which is contained in the present read partition and includes event data to be recorded persistently, is then read out and forwarded.

In the exemplary embodiments shown, in each case the individual data frames DR pertain to a time window 27. As also evident from FIG. 2, reference information 25 of individual data frames DR in each instance includes a corresponding memory area, which preferably is represented by a data-frame pointer DRZ, and corresponding time window 27 having a start timestamp 28 and an end timestamp 29 of individual data frames DR, in which at least one data segment of the event data contained in corresponding data frame DR was generated or acquired.

Figure 2:
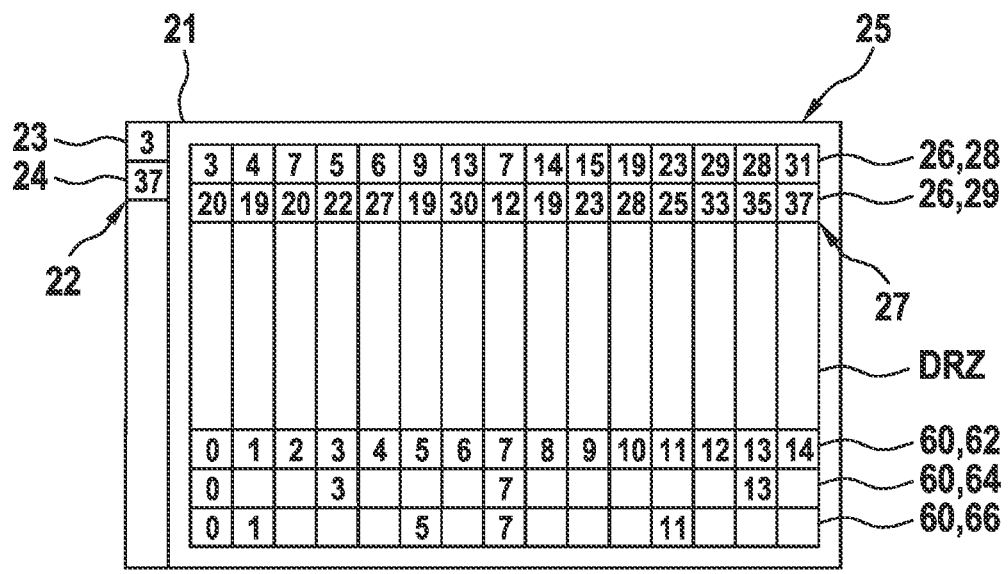
FIG. 2 shows a schematic representation of an exemplary embodiment of a partition for the method according to an example embodiment of the present invention for recording event data in a vehicle from FIG. 1.

As also shown in FIG. 2, in each case a time window 22 is assigned to individual partitions 21, an oldest start timestamp 28 of reference information 25 of a corresponding data frame DR contained in partition 21 being used as start timestamp 23 of time window 22 of a corresponding partition 21. As end timestamp 24 of time window 22 of corresponding partition 21, a latest end timestamp 29 of reference information 25 of a corresponding data frame DR contained in partition 21 is used. As further evident from FIG. 2, each fully written partition 21 shown includes the reference information of fifteen data frames DR, each of which pertains to a corresponding time window 27. For example, time window 22 of partition 21 shown has the value "3" of start timestamp 28 of a first data frame DR, which corresponds to oldest start timestamp 28 in partition 21 shown. As end timestamp 24, partition 21 shown has the value "37" of end timestamp 29 of last data frame DR, for example, which corresponds to the latest end timestamp 29 in partition 21 shown.

In the exemplary embodiments shown, a start time EZF_1 of present event time window EZF shown in FIG. 3 is predetermined as timestamp in relation to a present zero reference time B shown in FIG. 4. An end time EZF_2 of present event time window EZF is predetermined as time difference with respect to start time EZF_1, present zero reference time B being redefined, if necessary. For example, present zero reference time B is redefined if a new present event time window EZF is not able to be represented with present zero reference time B, because start time EZF_1 of new present event time window EZF is too distant in time from present zero reference time B. In addition, start timestamp 28 and end timestamp 29 of individual data frames DR and thus also start timestamp 23 and end timestamp 24 of individual partitions 21 are related to present zero reference time B, as well.

Next, the process for redefining zero reference time B is described with reference to FIG. 4. As evident from FIG. 4, the two zero reference times A, B last used are stored in a memory location Epoch A, Epoch B, respectively, a marking M in a corresponding memory location in present event time window EZF indicating to which of the two stored zero reference times A, B start time EZF_1 of present event time window EZF relates. As a rule, an oldest zero reference time corresponds to a start time of the vehicle. In the exemplary embodiment shown, present event time window EZF is coded in 32 bits. In this case, bits 0 to 13 represent the duration or length of present event time window EZF, bits 14 to 30 represent start time EZF_1 of present event time window EZF as the time difference of start time EZF_1 of present event time window EZF with respect to present zero reference time B. Bit 31 represents the marking of presently valid zero reference time B. Thus, for example, the validity of zero reference time A stored in memory location Epoch A may be marked by a logical value "0", and the validity of zero reference time B stored in memory location Epoch B may be marked by a logical value "1", for instance. In FIG. 4, the second row of the table shows a present state of the corresponding memory area. In other words, an older first zero reference time A having the exemplary value 2:00:00:000 is stored in memory location Epoch A, and a more recent second zero reference time B having the value 8:00:00:000 is stored in memory location Epoch B, marking M with the value "B" shown indicating that later second zero reference time B stored in memory location Epoch B corresponds to present zero reference time B. In this case, an oldest zero reference time corresponds to a start time of the vehicle.

As FIG. 4 also shows, in the case of a redefinition of zero reference time B presently used, first of all, older zero reference time A of the two stored zero reference times A, B is overwritten with a new zero reference time C. In FIG. 4, the third row of the table shows this state of the corresponding memory area. In other words, new zero reference time C having the exemplary value 16:00:00:000 is stored in memory location Epoch A. In addition, the now older second zero reference time B having the value 8:00:00:000 is stored in memory location Epoch B, marking M having value "B" shown indicating, moreover, that second zero reference time B stored in memory location Epoch B corresponds to present zero reference time B. New zero reference time C is then marked in an atomic operation as present zero reference time C. In FIG. 4, the fourth row of the table shows this state of the corresponding memory area. In other words, new zero reference time C having the exemplary value 16:00:00:000 is stored in memory location Epoch A. In addition, the now older second zero reference time B having the value 8:00:00:000 is stored in memory location Epoch B, marking M having value "A" shown now indicating that new zero reference time C stored in memory location Epoch A now corresponds to present zero reference time C. New present event time window EZF is subsequently written atomically relative to new present zero reference time C. In FIG. 4, the fifth row of the table shows the state of the corresponding memory area after the redefinition of present zero reference time C.

In the following, the process, carried out in step S135, for determining a present write partition for method 100 according to the present invention for recording event data in a vehicle is described in greater detail. In this connection, as a function of the at least one predetermined write criterion, a new write partition is sought when the vehicle is restarted or the present write partition is completely written with reference information 25. In the exemplary embodiments shown, present event time window EZF, if existent, is stored locally prior to determining the present write partition. The process determines a set of partitions 21 which have no valid time window 22, or have a valid time window 22 that is completely older than the maximum pre-event point in time and does not overlap an existing present event time window EZF. From this set of partitions 21, one partition 21 which has no valid time window 22 or one partition 21 whose corresponding valid time window 22 has the oldest start timestamp 23 is determined as present write partition.

A process 160 for determining and marking temporally randomly-sorted subsequences is described in the following with reference to FIG. 5. In this case, upon each writing of reference information 25 of a new data frame DR, time window 27 of new data frame DR is compared to time window 27 of the data frame DR whose reference information 25 was written previously as last into the at least one partition.

As can be seen from FIG. 5, process 160 is started in step S200 after the writing of reference information 25 of a new data frame DR. In step S210, written reference information 25 of individual data frames DR is numbered consecutively in ascending order according to its write sequence. Therefore, individual partitions 21 include additional auxiliary information 60, as further evident from FIG. 2. In this case, written reference information 25 of individual data frames DR includes a numbering 62 which numbers reference information 25 of individual data frames DR of partition 21 shown in FIG. 2 consecutively in ascending order according to its write sequence.

In step S220, start timestamp 28 in reference information 25 of new data frame DR is compared to start timestamp 28 in reference information 25 of last-written data frame DR. If the comparison in step S220 shows that start timestamp 28 of new data frame DR is later than start timestamp 28 of last-written data frame DR, in step S230, a temporally randomly-sorted present start-time subsequence 64 is recognized and continued. Process 160 is subsequently continued with step S250. If the comparison in step S220 shows that start timestamp 28 of new data frame DR is older than start timestamp 28 of last-written data frame DR, in step S240, a new start-time subsequence 64 is started and its start timestamp 28 is marked by storing corresponding numbering 62 of new data frame DR. In this case, a first start-time subsequence 64 starts with start timestamp 28 of first-written data frame DR. Process 160 is subsequently continued with step S250. Therefore, the partition shown in FIG. 2 has an additional data field for displaying auxiliary information 60, which pertains to temporally randomly-sorted start-time subsequences 64. To that end, the numberings of initial values of temporally randomly-sorted start-time subsequences 64 ascertained are stored in the additional data field.

As also evident from FIG. 2, partition 21 shown by way of example includes four start-time subsequences 64. In this case, first start-time subsequence 64 starts with a lowest number "0" of ascending numbering 62. A second start-time subsequence 64 starts with a number "3" of ascending numbering 62, since start timestamp 28 of corresponding data frame DR having the value "5" is older than start timestamp 28 having the value "7" of previous data frame DR. A third start-time subsequence 64 starts with a number "7" of ascending numbering 62, since start timestamp 28 of corresponding data frame DR having the value "7" is older than start timestamp 28 having the value "13" of previous data frame DR. A fourth start-time subsequence 64 starts with a number "13" of ascending numbering 62, since start timestamp 28 of corresponding data frame DR having the value "28" is older than start timestamp 28 having the value "29" of previous data frame DR.

In step S250, end timestamp 29 of new data frame DR is compared to end timestamp 29 of last-written data frame DR. If the comparison in step S250 shows that end timestamp 29 of new data frame DR is later than end timestamp 29 of last-written data frame DR, in step S260, a temporally randomly-sorted present end-time subsequence 66 is recognized and continued. Process 160 is subsequently ended in step S280. If the comparison in step S250 shows that end timestamp 29 of new data frame DR is older than end timestamp 29 of last-written data frame DR, in step S270, a new end-time subsequence 66 is started and its end timestamp 29 is marked by storing corresponding numbering 62 of new data frame DR. In this case, a first end-time subsequence 66 starts with end timestamp 29 of first-written data frame DR.

Process 160 is subsequently ended in step S280. Therefore, the partition shown in FIG. 2 has an additional data field for displaying auxiliary information 60, which pertains to temporally randomly-sorted end-time subsequences 66. To that end, the numberings of initial values of temporally randomly-sorted end-time subsequences 66 ascertained are stored in the additional data field.

As also evident from FIG. 2, partition 21 shown by way of example includes five end-time subsequences 66. In this case, first end-time subsequence 66 starts with the lowest number "0" of ascending numbering 62. A second end-time subsequence 66 starts with a number "1", since end timestamp 29 of corresponding data frame DR having the value "19" is older than end timestamp 29 having the value "20" of previous data frame DR. A third end-time subsequence 66 starts with a number "5", since end timestamp 29 of corresponding data frame DR having the value "19" is older than end timestamp 29 having the value "27" of previous data frame DR. A fourth end-time subsequence 66 starts with a number "7", since end timestamp 29 of corresponding data frame DR having the value "12" is older than end timestamp 29 having the value "30" of previous data frame DR. A fifth end-time subsequence 66 starts with a number "11", since end timestamp 29 of corresponding data frame DR having the value "25" is older than end timestamp 29 having the value "28" of previous data frame DR.

In the exemplary embodiment of method 100 according to the present invention shown, reference information 25 of at least one data frame DR to be read out from the present read partition is ascertained as a function of the temporal relationship of the at least one temporally randomly-sorted start-time subsequence 64 and/or of the at least one temporally randomly-sorted end-time subsequence 66 of the present read partition, to present event time window EZF.

FIG. 3 shows, by way of example, four time windows 22A, 22B, 22C, 22D of partitions 21 which overlap with present event time window EZF. Since all time windows 22A, 22B, 22C, 22D shown overlap present event time window EZF, all corresponding partitions 21 are suited to be determined as present read partition. Since time window 22A, 22B, 22C, 22D of the present read partition overlaps present event time window EZF, at least one data frame DR of the present read partition overlaps present event time window EZF, as well. Reference information 25 of at least one data frame DR, whose time window 27 overlaps with present event time window EZF, is read out from the present read partition. In this case, time window 27 of the at least one data frame DR is made invalid in reference information 25 after reference information 25 has been read out.

As also evident from FIG. 3, start timestamp 23 of a first time window 22 of a corresponding partition 21 lies outside of present event time window EZF, and end timestamp 24 of first time window 22 of corresponding partition 21 lies within present event time window EZF. Therefore, partition 21 may contain data frames DR which are too old for present event time window EZF, but may contain no data frames DR which are too recent for present event time window EZF. Thus, in order to ascertain reference information 25 of data frames DR to be read out from partition 21, only end timestamps 29 of data frames DR of marked, temporally randomly-sorted end-time subsequences 66 are compared to start time EZF_1 of present event time window EZF, in order to recognize data frames DR which lie completely before present event time window EZF.

Described in the following by way of example for a present event time window EZF having a start time EZF_1 with a value of "25" and an end time EZF_2 with a value of "40", is a read-out operation of reference information 25 from partition 21 shown in FIG. 2, which has first time window 22A having a start timestamp 23 with a value "3" and an end timestamp 24 with a value "37".

In this case, first of all, randomly-sorted first end-time subsequence 66, which has only one entry with the number "0", is checked. To that end, end timestamp 29 of data frame DR having the number "0", which has a value of "20", is read from corresponding reference information 25 and compared to start time EZF_1 of present event time window EZF of "25". Since end timestamp 29 having the value "20" is older than start time EZF_1 of present event time window EZF of "25", corresponding data frame DR having number "0", start timestamp 28 of "3" and end timestamp 29 of "20" is too old, so that corresponding reference information 25 is not forwarded. Since first end-time subsequence 66 contains no further entries of time frames DR, the check of first end-time subsequence 66 is thus concluded. Randomly-sorted second end-time subsequence 66, which has four entries having the numbers "1", "2", "3" and "4", is then checked. To that end, first of all, end timestamp 29 of data frame DR having the number "4", which has a value of "27" and corresponds to the last entry of second end-time subsequence 66, is read from corresponding reference information 25 and compared to start time EZF_1 of present event time window EZF of "25". Since end timestamp 29 having the value "27" is later than start time EZF_1 of present event time window EZF of "25", corresponding data frame DR having the number "4" overlaps with present event time window EZF, so that corresponding reference information 25 is passed on and data frame DR having the number "4" is stored persistently. In addition, time window 27 is erased in reference information 25 of data frame DR having the number "4" in partition 21. End timestamp 29 is then read from corresponding reference information 25 of the next entry, that is, of data frame DR having the number "3", which has a value of "22", and compared to start time EZF_1 of present event time window EZF of "25". Since end timestamp 29 having the value "22" is older than start time EZF_1 of present event time window EZF of "25", corresponding data frame DR having the number "3" is too old, so that corresponding reference information 25 is not forwarded. Since because of the random sorting, the further entries of data frames DR having the numbers "2" and "1" in second end-time subsequence 66 have even older end timestamps 29 of "20" and "19", respectively, the check of second end-time subsequence 66 is concluded.

Randomly-sorted third end-time subsequence 66, which has two entries having the numbers "5" and "6", is then checked. To that end, first of all, end timestamp 29 of data frame DR having the number "6", which has a value of "30" and corresponds to the last entry of third end-time subsequence 66, is read from corresponding reference information 25 and compared to start time EZF_1 of present event time window EZF of "25". Since end timestamp 29 having the value "30" is later than start time EZF_1 of present event time window EZF of "25", corresponding data frame DR having the number "6" overlaps with present event time window EZF, so that corresponding reference information 25 is passed on and data frame DR having the number "6" is stored persistently. In addition, time window 27 is erased in reference information 25 of data frame DR having the number "6" in partition 21. End timestamp 29 is then read from corresponding reference information 25 of the next entry, that is, of data frame DR having the number "5", which has a value of "19", and compared to start time EZF_1 of present event time window EZF of "25". Since end timestamp 29 having the value "19" is older than start time EZF_1 of present event time window EZF of "25", corresponding data frame DR having the number "5" is too old, so that corresponding reference information 25 is not forwarded. Since third end-time subsequence 66 contains no further entries of time frames DR, the check of third end-time subsequence 66 is thus concluded.

Randomly-sorted fourth end-time subsequence 66, which has four entries having the numbers "7", "8", "9" and "10", is subsequently checked. To that end, first of all, end timestamp 29 of data frame DR having the number "10", which has a value of "28" and corresponds to the last entry of fourth end-time subsequence 66, is read from corresponding reference information 25 and compared to start time EZF_1 of present event time window EZF of "25". Since end timestamp 29 having the value "28" is later than start time EZF_1 of present event time window EZF of "25", corresponding data frame DR having the number "10" overlaps with present event time window EZF, so that corresponding reference information 25 is passed on and data frame DR having the number "10" is stored persistently. In addition, time window 27 is erased in reference information 25 of data frame DR having the number "10" in partition 21. End timestamp 29 is then read from corresponding reference information 25 of the next entry, that is, of data frame DR having the number "9", which has a value of "23", and compared to start time EZF_1 of present event time window EZF of "25". Since end timestamp 29 having the value "23" is older than start time EZF_1 of present event time window EZF of "25", corresponding data frame DR having the number "9" is too old, so that corresponding reference information 25 is not forwarded. Since because of the random sorting, the further entries of data frames DR having the numbers "8" and "7" in fourth end-time subsequence 66 have even older end timestamps 29 of "19" and "12", respectively, the check of fourth end-time subsequence 66 is concluded.

Randomly-sorted fifth end-time subsequence 66, which has four entries having the numbers "11", "12", "13" and "14", is then checked. To that end, first of all, end timestamp 29 of data frame DR having the number "14", which has a value of "37" and corresponds to the last entry of fifth end-time subsequence 66, is read from corresponding reference information 25 and compared to start time EZF_1 of present event time window EZF of "25". Since end timestamp 29 having the value "37" is later than start time EZF_1 of present event time window EZF of "25", corresponding data frame DR having the number "14" likewise overlaps with present event time window EZF, so that corresponding reference information 25 is passed on and data frame DR having the number "14" is stored persistently. In addition, time window 27 is erased in reference information 25 of data frame DR having the number "14" in partition 21. End timestamp 29 is then read from corresponding reference information 25 of the next entry, that is, of data frame DR having the number "13", which has a value of "35", and compared to start time EZF_1 of present event time window EZF of "25". Since end timestamp 29 having the value "35" is later than start time EZF_1 of present event time window EZF of "25", corresponding data frame DR having the number "13" overlaps with present event time window EZF, so that corresponding reference information 25 is passed on and data frame DR having the number "13" is stored persistently. In addition, time window 27 is erased in reference information 25 of data frame DR having the number "13" in partition 21. End timestamp 29 is then read from corresponding reference information 25 of the next entry, that is, of data frame DR having the number "12", which has a value of "33", and compared to start time EZF_1 of present event time window EZF of "25". Since end timestamp 29 having the value "33" is later than start time EZF_1 of present event time window EZF of "25", corresponding data frame DR having the number "12" overlaps with present event time window EZF, so that corresponding reference information 25 is passed on and data frame DR having the number "12" is stored persistently. In addition, time window 27 is erased in reference information 25 of data frame DR having the number "12" in partition 21. End timestamp 29 is then read from corresponding reference information 25 of the next entry, that is, of data frame DR having the number "11", which has a value of "25", and compared to start time EZF_1 of present event time window EZF of "25". Since end timestamp 29 having the value "25" corresponds to start time EZF_1 of present event time window EZF of "25", corresponding data frame DR having the number "11" likewise overlaps with present event time window EZF, so that corresponding reference information 25 is passed on and data frame DR having the number "11" is stored persistently. In addition, time window 27 is erased in reference information 25 of data frame DR having the number "11" in partition 21. Since fifth end-time subsequence 66 contains no further entries of time frames DR, the check of fifth end-time subsequence 66 is thus concluded.

Since partition 21 includes no further randomly-sorted end-time subsequences 66, the check of partition 21 overall is completed.

As evident from this example, the ascertainment and marking of randomly-sorted end-time subsequences 66 carries into effect at least one unsuccessful comparison of an end timestamp 29 of a data frame DR to start time EZF_1 of present event time window EZF. Depending on the number of end-time subsequences 66 in partition 21, this is more than in the case of a partition 21 that is completely sorted. In general, however, this is better than without the information of end-time subsequences 66. In the example above, only four data frames DR are checked unsuccessfully, even though exemplary partition 21 contains eight data frames DR which are too old. In other words, the unnecessary checking of four data frames DR is eliminated by the use of end-time subsequences 66.

As also evident from FIG. 3, start timestamp 23 and end timestamp 24 of a second time window 22B of a corresponding partition 21 lie within present event time window EZF. Consequently, partition 21 contains neither data frames DR which are too old for present event time window EZF, nor data frames DR which are too recent for present event time window EZF, so that reference information 25 of all data frames DR in corresponding partition 21 is read out without further checking and passed on, and corresponding data frames DR are stored persistently.

As also shown in FIG. 3, start timestamp 28 of a third time window 22C of a corresponding partition 21 lies within present event time window EZF, and end timestamp 29 of third time window 22C of corresponding partition 21 lies outside of present event time window EZF. Partition 21 therefore may contain data frames DR which are too recent for present event time window EZF, but may contain no data frames DR which are too old for present event time window EZF. Thus, in order to ascertain reference information 25 of data frames DR to be read out from partition 21, only start timestamps 28 of marked, temporally randomly-sorted start-time subsequences 64 are compared to end time EZF_2 of present event time window EZF, in order to recognize data frames DR which lie completely after present event time window EZF.

Described in the following by way of example for a present event time window EZF having a start time EZF_1 with a value of "1" and an end time EZF_2 with a value of "10", is a read operation of reference information 25 from partition 21 shown in FIG. 2, which has third time window 22C having a start timestamp 23 with a value "3" and an end timestamp 24 with a value "37".

In this case, first of all, randomly-sorted first start-time subsequence 64, which has three entries having the numbers "0", "1" and "2", is checked. To that end, start timestamp 28 of data frame DR having the number "0", which has a value of "3", is read from corresponding reference information 25 and compared to end time EZF_2 of present event time window EZF of "10". Since start timestamp 28 having the value "3" is older than end time EZF_2 of present event time window EZF of "10", corresponding data frame DR having the number "0" overlaps with present event time window EZF, so that corresponding reference information 25 is passed on and data frame DR having the number "0" is stored persistently. In addition, time window 27 is erased in reference information 25 of data frame DR having the number "0" in partition 21. Start timestamp 28 is then read from corresponding reference information 25 of the next entry, that is, of data frame DR having the number "1", which has a value of "4", and compared to end time EZF_2 of present event time window EZF of "10". Since start timestamp 28 having the value "4" is older than end time EZF_2 of present event time window EZF of "10", corresponding data frame DR having the number "1" likewise overlaps with present event time window EZF, so that corresponding reference information 25 is passed on and data frame DR having the number "1" is stored persistently. In addition, time window 27 is erased in reference information 25 of data frame DR having the number "1" in partition 21. Start timestamp 28 is then read from corresponding reference information 25 of the next entry, that is, of data frame DR having the number "2", which has a value of "7", and compared to end time EZF_2 of present event time window EZF of "10". Since start timestamp 28 having the value "7" is older than end time EZF_2 of present event time window EZF of "10", corresponding data frame DR having the number "2" likewise overlaps with present event time window EZF, so that corresponding reference information 25 is passed on and data frame DR having the number "2" is stored persistently. In addition, time window 27 is erased in reference information 25 of data frame DR having the number "2" in partition 21.

Randomly-sorted second start-time subsequence 64, which has four entries having the numbers "3", "4", "5" and "6", is subsequently checked. To that end, start timestamp 28 of data frame DR having the number "3", which has a value of "5", is read from corresponding reference information 25 and compared to end time EZF_2 of present event time window EZF of "10". Since start timestamp 28 having the value "5" is older than end time EZF_2 of present event time window EZF of "10", corresponding data frame DR having the number "3" overlaps with present event time window EZF, so that corresponding reference information 25 is passed on and data frame DR having the number "3" is stored persistently. In addition, time window 27 is erased in reference information 25 of data frame DR having the number "3" in partition 21. Start timestamp 28 is then read from corresponding reference information 25 of the next entry, that is, of data frame DR having the number "4", which has a value of "6", and compared to end time EZF_2 of present event time window EZF of "10". Since start timestamp 28 having the value "6" is older than end time EZF_2 of present event time window EZF of "10", corresponding data frame DR having the number "4" likewise overlaps with present event time window EZF, so that corresponding reference information 25 is passed on and data frame DR having the number "4" is stored persistently. In addition, time window 27 is erased in reference information 25 of data frame DR having the number "4" in partition 21. Start timestamp 28 is then read from corresponding reference information 25 of the next entry, that is, of data frame DR having the number "5", which has a value of "9", and compared to end time EZF_2 of present event time window EZF of "10". Since start timestamp 28 having the value "9" is older than end time EZF_2 of present event time window EZF of "10", corresponding data frame DR having the number "5" likewise overlaps with present event time window EZF, so that corresponding reference information 25 is passed on and data frame DR having the number "5" is stored persistently. In addition, time window 27 is erased in reference information 25 of data frame DR having the number "5" in partition 21. Start timestamp 28 is then read from corresponding reference information 25 of the next entry, that is, of data frame DR having the number "6", which has a value of "13", and compared to end time EZF_2 of present event time window EZF of "10". Since start timestamp 28 having the value "13" is later than end time EZF_2 of present event time window EZF of "10", corresponding data frame DR having the number "6" is too recent, so that corresponding reference information 25 is not forwarded. Since second start-time subsequence 64 contains no further entries of time frames DR, the check of second start-time subsequence 64 is thus concluded.

Randomly-sorted third start-time subsequence 64, which has six entries having the numbers "7", "8", "9", "10", "11" and "12", is then checked. To that end, start timestamp 28 of data frame DR having the number "7", which has a value of "7", is read from corresponding reference information 25 and compared to end time EZF_2 of present event time window EZF of "10". Since start timestamp 28 having the value "7" is older than end time EZF_2 of present event time window EZF of "10", corresponding data frame DR having the number "7" overlaps with present event time window EZF, so that corresponding reference information 25 is passed on and data frame DR having the number "7" is stored persistently. In addition, time window 27 is erased in reference information 25 of data frame DR having the number "7" in partition 21. Start timestamp 28 is then read from corresponding reference information 25 of the next entry, that is, of data frame DR having the number "8", which has a value of "14", and compared to end time EZF_2 of present event time window EZF of "10". Since start timestamp 28 having the value "14" is later than end time EZF_2 of present event time window EZF of "10", corresponding data frame DR having the number "8" is too recent, so that corresponding reference information 25 is not forwarded. Since because of the random sorting, the further entries of data frames DR having the numbers "9", "10", "11" and "12" in third start-time subsequence 64 only have even later start timestamps 28 of "15", "19", "23" and "29", respectively, the check of third start-time subsequence 64 is concluded.

Randomly-sorted fourth start-time subsequence 64, which has two entries having the numbers "13" and "14", is then checked. To that end, start timestamp 28 of data frame DR having the number "13", which has a value of "28", is read from corresponding reference information 25 and compared to end time EZF_2 of present event time window EZF of "10". Since start timestamp 28 having the value "28" is later than end time EZF_2 of present event time window EZF of "10", corresponding data frame DR having the number "13" is too recent, so that corresponding reference information 25 is not forwarded. Since because of the random sorting, the further entry of data frame DR having the number "14" in fourth start-time subsequence 64 has an even later start timestamp 28 of "31", the check of fourth start-time subsequence 64 is concluded.

As evident from this example, the ascertainment and marking of randomly-sorted start-time subsequences 64 carries into effect at least one unsuccessful comparison of a start timestamp 28 of a data frame DR to end time EZF_1 of present event time window EZF. Depending on the number of start-time subsequences 64 in partition 21, this is more than in the case of a partition 21 that is completely sorted. In general, however, this is better than without the information of start-time subsequences 64. Only three data frames DR are checked unsuccessfully in the example above, even though exemplary partition 21 contains eight data frames DR which are too recent. In other words, the unnecessary checking of five data frames DR is eliminated by the use of start-time subsequences 64.

As also evident from FIG. 3, start timestamp 28 and end timestamp 29 of a fourth time window 22D of a corresponding partition 21 lie outside of present event time window EZF.

Therefore corresponding partition 21 may contain data frames DR which are too recent for present event time window EZF, and may contain data frames DR which are too old for present event time window EZF. Thus, in order to ascertain reference information 25 of data frames DR to be read out from partition 21, start timestamps 28 of marked, temporally randomly-sorted start-time subsequences 64 are compared to end time EZF_2 of present event time window EZF, in order to recognize data frames DR which lie completely after present event time window EZF. In addition, end timestamps 29 of marked, temporally randomly-sorted end-time subsequences 66 are compared in each case to start time EZF_1 of present event time window EZF, in order to recognize time frames DR which lie completely before present event time window EZF.

In this case, first of all, randomly-sorted end-time subsequences 66 are used to find a data frame DR that does not lie completely before event time window EZF. For that purpose, first of all, end timestamp 29 of data frame DR of the last entry of a first randomly-sorted end-time subsequence 66 is compared to start time EZF_1 of present event time window EZF in order to check whether data frames DR of first randomly-sorted end-time subsequence 66 lie completely before event time window EZF. If yes, then the process is continued with next randomly-sorted end-time subsequence 66, and reference information 25 of data frames DR of first randomly-sorted end-time subsequence 66 is not forwarded. If not, then beginning with the first entry, end timestamps 29 of data frames DR of first randomly-sorted end-time subsequence 66 are checked in order to find a data frame DR which does not lie completely before event time window EZF, since earlier entries of data frames DR of randomly-sorted first end-time subsequence 66 may still be completely older than present event time window EZF. After the number of a first such data frame DR is determined, corresponding randomly-sorted start-time subsequence 64 which contains this first data frame DR. To ensure that data frames DR do not lie completely after event time window EZF, beginning with start timestamp 28 of ascertained first data frame DR, start timestamps 28 of data frames DR of first randomly-sorted start-time subsequence 64 are compared to end time EZF_2 of present event time window EZF in order to find a data frame DR which lies completely after event time window EZF. If a data frame DR is found which lies completely after present event time window EZF, then the process is continued with a first entry of next randomly-sorted start-time subsequence 64. In addition, each time a data frame DR is found which overlaps with present event time window EZF, it is checked whether data frame DR found still belongs to previously-checked, randomly-sorted end-time subsequence 66. If this is the case, reference information 25 of found data frame DR is passed on and time window 27 is erased in reference information 25 of data frame DR in partition 21. Otherwise, the process is continued with the randomly-sorted end-time subsequence 66 to which found data frame DR belongs.

Described in the following by way of example for a present event time window EZF having a start time EZF_1 with a value of "5" and an end time EZF_2 with a value of "15", is a read-out operation of reference information 25 from partition 21 shown in FIG. 2, which has fourth time window 22D having a start timestamp 23 with a value of "3" and an end timestamp 24 with a value of "37".

In this case, first of all, randomly-sorted first end-time subsequence 66, which has only one entry with the number "0", is checked. To that end, end timestamp 29 of data frame DR having the number "0", which has a value of "20", is read from corresponding reference information 25 and compared to start time EZF_1 of present event time window EZF having the value "25". Since end timestamp 29 having the value "20" is later than start time EZF_1 of present event time window EZF having the value "5", corresponding data frame DR having the number "0" does not lie completely before present event time window EZF. Since first end-time subsequence 66 contains no further entries of data frames DR, the process is continued with the checking of first start-time subsequence 64, which has three entries with the numbers "0", "1" and "2" and to which data frame DR having the number "0" belongs. To that end, start timestamp 28 of data frame DR having the number "0", which has a value of "3", is read from corresponding reference information 25 and compared to end time EZF_2 of present event time window EZF having the value "15". Since start timestamp 28 having the value "3" is older than end time EZF_2 of present event time window EZF having the value "15", corresponding data frame DR having the number "0" overlaps with present event time window EZF, so that corresponding reference information 25 is passed on and data frame DR having the number "0" is stored persistently. In addition, time window 27 is erased in reference information 25 of data frame DR having the number "0" in partition 21.

Start timestamp 28 is then read from corresponding reference information 25 of the next entry, that is, of data frame DR having the number "1", which has a value of "4", and compared to end time EZF_2 of present event time window EZF of "15". Although start timestamp 28 having the value "4" is older than end time EZF_2 of present event time window EZF having the value "15", so that data frame DR having the number "1" does not lie completely after present event time window EZF, data frame DR having the number "1" no longer belongs to checked, randomly-sorted, first end-time subsequence 66.

Therefore, the process is continued with randomly-sorted second end-time subsequence 66, which has four entries having the numbers "1", "2", "3" and "4". To that end, first of all, end timestamp 29 of data frame DR having the number "4", which has a value of "27" and corresponds to the last entry of second end-time subsequence 66, is read from corresponding reference information 25 and compared to start time EZF_1 of present event time window EZF having the value "5". Since end timestamp 29 having the value "27" is later than start time EZF_1 of present event time window EZF having the value "5", corresponding data frame DR having the number "4" is not located completely before present event time window EZF, so that randomly-sorted second end-time subsequence 66 is further checked and the process is continued with the first entry of randomly-sorted second end-time subsequence 66.

Therefore, end timestamp 29 of data frame DR having the number "1", which has a value of "19" and corresponds to the first entry of second end-time subsequence 66, is read from corresponding reference information 25 and compared to start time EZF_1 of present event time window EZF having the value "5". Since end timestamp 29 having the value "19" is later than start time EZF_1 of present event time window EZF having the value "5", corresponding data frame DR having the number "1" is not located completely before present event time window EZF. Because of the random sorting of second end-time subsequence 66, this holds true for end timestamps 29 of data frames DR having the numbers "2" and "3", as well. Since already-checked start timestamp 28, having the value "4", of data frame DR having the number "1" is not located after present event time window EZF, data frame DR having the number "1" overlaps with present event time window EZF, so that corresponding reference information 25 is passed on and data frame DR having the number "1" is stored persistently. In addition, time window 27 is erased in reference information 25 of data frame DR having the number "1" in partition 21. Start timestamps 28 of data frames DR having the numbers "2", "3" and "4", which have the values of "7", "5" and "6", are then checked, read one after the other from corresponding reference information 25 and compared to end time EZF_2 of present event time window EZF having the value "15". Since start timestamps 28 of data frames DR having the numbers "2", "3" and "4" are all older than end time EZF_2 of present event time window EZF having the value "15", corresponding data frames DR having the numbers "2", "3" and "4" overlap with present event time window EZF, so that corresponding reference information 25 is passed on and data frames DR having the numbers "2", "3" and "4" are stored persistently. In addition, time windows 27 are erased in reference information 25 of data frames DR having the numbers "2", "3" and "4" in partition 21. Start timestamp 28 is then read from corresponding reference information 25 of the next entry of randomly-sorted second start-time subsequence 64, that is, of data frame DR having the number "5", which has a value of "9", and compared to end time EZF_2 of present event time window EZF having the value "15". Although start timestamp 28 having the value "9" is older than end time EZF_2 of present event time window EZF having the value "15", so that data frame DR having the number "5" does not lie completely after present event time window EZF, data frame DR having the number "5" no longer belongs to checked, randomly-sorted, second end-time subsequence 66.

Therefore, the process is continued with randomly-sorted third end-time subsequence 66, which has two entries having the numbers "5" and "6". To that end, first of all, end timestamp 29 of data frame DR having the number "6", which has a value of "30" and corresponds to the last entry of second end-time subsequence 66, is read from corresponding reference information 25 and compared to start time EZF_1 of present event time window EZF of "5". Since end timestamp 29 having the value "30" is later than start time EZF_1 of present event time window EZF of "5", corresponding data frame DR having the number "4" is not located completely before present event time window EZF, so that randomly-sorted third end-time subsequence 66 is further checked and the process is continued with the first entry of randomly-sorted second end-time subsequence 66.

Therefore, end timestamp 29 of data frame DR having the number "5", which has a value of "19" and corresponds to the first entry of third end-time subsequence 66, is read from corresponding reference information 25 and compared to start time EZF_1 of present event time window EZF of "5". Since end timestamp 29 having the value "19" is later than start time EZF_1 of present event time window EZF of "5", corresponding data frame DR having the number "5" is not located completely before present event time window EZF. Since already-checked start timestamp 28, having the value "9", of data frame DR having the number "5" is not located after present event time window EZF, data frame DR having the number "5" overlaps with present event time window EZF, so that corresponding reference information 25 is passed on and data frame DR having the number "5" is stored persistently. In addition, time window 27 is erased in reference information 25 of data frame DR having the number "5" in partition 21. Start timestamp 28 of data frame DR having the number "6", which has a value of "13", is subsequently checked, read from corresponding reference information 25 and compared to end time EZF_2 of present event time window EZF of "15". Since start timestamp 28 of data frame DR having the number "6" is older than end time EZF_2 of present event time window EZF, corresponding data frame DR having the number "6" overlaps with present event time window EZF, so that corresponding reference information 25 is passed on and data frame DR having the number "6" is stored persistently. In addition, time window 27 is erased in reference information 25 of data frame DR having the number "6" in partition 21.

Start timestamp 28 is then read from corresponding reference information 25 of the next entry of randomly-sorted third start-time subsequence 64, that is, of data frame DR having the number "7", which has a value of "7", and compared to end time EZF_2 of present event time window EZF having the value "15". Although start timestamp 28 having the value "7" is older than end time EZF_2 of present event time window EZF having the value of "15", so that data frame DR having the number "7" does not lie completely after present event time window EZF, data frame DR having the number "7" no longer belongs to checked, randomly-sorted, third end-time subsequence 66.

Therefore, the process is continued with randomly-sorted fourth end-time subsequence 66, which has four entries having the numbers "7", "8", "9" and "10". To that end, first of all, end timestamp 29 of data frame DR having the number "10", which has a value of "28" and corresponds to the last entry of fourth end-time subsequence 66, is read from corresponding reference information 25 and compared to start time EZF_1 of present event time window EZF having the value "5". Since end timestamp 29 having the value "28" is later than start time EZF_1 of present event time window EZF having the value "5", corresponding data frame DR having the number "10" is not located completely before present event time window EZF, so that randomly-sorted fourth end-time subsequence 66 is further checked and the process is continued with the first entry of randomly-sorted fourth end-time subsequence 66.

Therefore, end timestamp 29 of data frame DR having the number "7", which has a value of "12" and corresponds to the first entry of fourth end-time subsequence 66, is read from corresponding reference information 25 and compared to start time EZF_1 of present event time window EZF having the value "5". Since end timestamp 29 having the value "12" is later than start time EZF_1 of present event time window EZF having the value "5", corresponding data frame DR having the number "7" is not located completely before present event time window EZF. Because of the random sorting of second end-time subsequence 66, this holds true for end timestamps 29 of data frames DR having the numbers "8" and "9", as well. Since already-checked start timestamp 28, having the value "7", of data frame DR having the number "7" is not located after present event time window EZF, data frame DR having the number "7" overlaps with present event time window EZF, so that corresponding reference information 25 is passed on and data frame DR having the number "7" is stored persistently. In addition, time window 27 is erased in reference information 25 of data frame DR having the number "7" in partition 21. Start timestamps 28 of data frames DR having the numbers "8", "9" and "10", which have the values of "14", "15" and "16", are subsequently checked one after the other, read from corresponding reference information 25 and compared to end time EZF_2 of present event time window EZF having the value "15". Since start timestamps 28 of data frames DR having the numbers "8" and "9" are not later than end time EZF_2 of present event time window EZF having the value "15", corresponding data frames DR having the numbers "8" and "9" overlap with present event time window EZF, so that corresponding reference information 25 is passed on and data frames DR having the numbers "8" and "9" are stored persistently. In addition, time windows 27 are erased in reference information 25 of data frames DR having the numbers "8" and "9" in partition 21. Since start timestamp 28 having the value "19" of the data frame having the number "10" is later than end time EZF_2 of present event time window EZF of "15", corresponding data frame DR having the number "10" is too recent, so that corresponding reference information 25 is not forwarded. Since because of the random sorting, the further entries of data frames DR having the numbers "11" and "12" in third start-time subsequence 64 have an even later start timestamp 28 of "23" and "29", the further entries of data frames DR having the numbers "11" and "12" are also not passed on and the check of third start-time subsequence 64 is concluded.

The process is subsequently continued with randomly-sorted fourth start-time subsequence 64, which has two entries having the numbers "13" and "14". To that end, start timestamp 28 is read from corresponding reference information 25 of the first entry, that is, of data frame DR having the number "13", which has a value of "28", and compared to end time EZF_2 of present event time window EZF of "15". Since start timestamp 28 of data frame DR having the number "13" with the value "19" is later than end time EZF_2 of present event time window EZF of "15", corresponding data frame DR having the number "13" is too recent, so that corresponding reference information 25 is not forwarded. Since because of the random sorting, the further entry of data frame DR having the number "14" in fourth start-time subsequence 64 has an even later start timestamp 28 of "31", the further entry of data frame DR having the number "14" is also not passed on and the check of fourth start-time subsequence 64 is concluded. With that, the check of partition 21 is also concluded. This may seem complex, but the number of comparisons of start timestamps 28 and end timestamps 29 carried out is considerably less in comparison to the checking of all start timestamps 28 and all end timestamps 29 of data frames DR contained in the partition.

Prior to determining the present read partition, the existing present event time window EZF is stored locally, locally-stored present event time window EZF being compared to present event time window EZF before each read-out operation of reference information 25 of at least one data frame DR. In this context, present event time window EZF is stored locally when it differs from locally-stored present event time window EZF. In addition, it is checked whether time window 22 of the present read partition and new present event time window EZF overlap, if locally-stored present event time window EZF was changed. The read-out operation of the read partition is restarted if the present read partition overlaps with changed present event time window EZF. Alternatively, a new present read partition is determined if the present read partition does not overlap with changed present event time window EZF.

Specific embodiments of method 100 according to the present invention may be implemented in software or hardware, for example, or in a mixed form of software and hardware.

Figure 6:
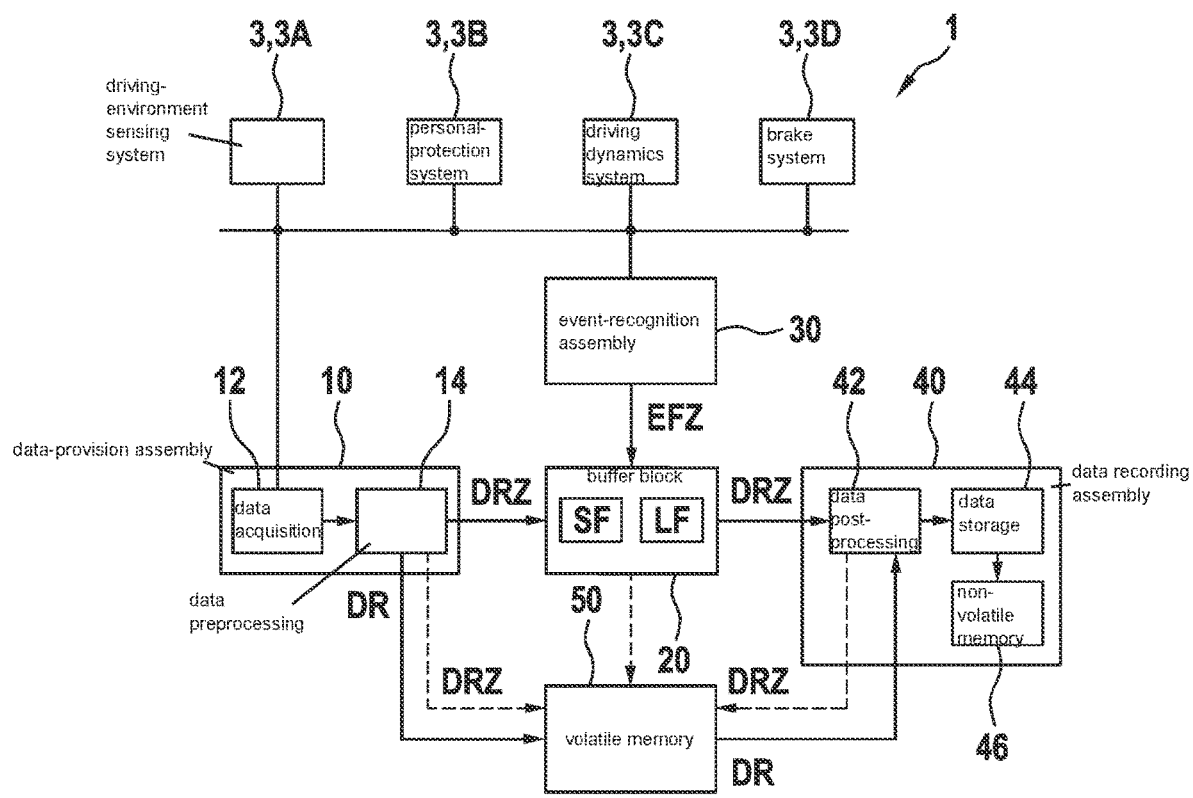
FIG. 6 shows a schematic block diagram of an exemplary embodiment of a device according to the present invention for carrying out the method of the present invention for recording event data in a vehicle from FIG. 1.

As evident from FIG. 6, the exemplary embodiment shown of a device 1 according to the present invention for carrying out method 100 for recording event data in a vehicle includes a data-provision assembly 10, a buffer block 20, an event-recognition assembly 30 and a data-recording assembly 40. Data-provision assembly 10 continuously receives vehicle data to be recorded from at least one vehicle system 3 and writes it as event data in data frames DR of a predetermined size, and stores the individual data frames DR in at least one volatile memory 50. Buffer block 20 manages stored data frames DR and keeps them available in the at least one volatile memory 50 until the event data stored in the individual frames DR is older than a predetermined maximum pre-event point in time, or is stored persistently in at least one non-volatile memory 46 in reaction to a predetermined event recognized by event-recognition assembly 30. Buffer block 20 here includes a write function SF and at least one partition 21 of a predetermined size. Write function SF writes received reference information 25 of individual data frames DR in any time sequence into the at least one partition 21 and ascertains and marks temporally randomly-sorted subsequences of written reference information 25 of individual data frames DR in the at least one partition 21.

In the exemplary embodiment shown, buffer block 20 includes multiple partitions 21 of a predetermined size. Depending on at least one write criterion, write function SF determines one of partitions 21 as present write partition and writes reference information 25 of individual data frames DR received from data-provision assembly 10 into the present write partition. In addition, in the exemplary embodiment shown, buffer block 20 includes a read function LF. In reaction to a request of data-recording assembly 40 and depending on at least one predetermined read criterion, which includes at least one present event time window EZF for which the event data is to be recorded persistently, read function LF determines one of the other partitions 21 as present read partition and reads out reference information 25 of data frames DR which is contained in the present read partition and includes event data to be recorded persistently, and forwards it to data-recording assembly 40. Data-recording assembly 40 stores data frames DR, corresponding to forwarded reference information 25, persistently in the at least one non-volatile memory 46.

Event-recognition assembly 30 continuously monitors the state of the vehicle and decides when a predetermined event has occurred which requires the persistent storing of the corresponding event data of the at least one vehicle system 3. Event-recognition assembly 30 outputs to buffer block 20 the present event time window EZF which corresponds to the recognized event and for which the event data is to be recorded persistently, a start time of present event time window EZF not being prior in time to the maximum pre-event point in time.

In the exemplary embodiment shown, a first vehicle system 3 is implemented as driving-environment sensing system 3A. A second vehicle system 3 is implemented as personal-protection system 3B, a third vehicle system 3 is realized as driving-dynamics system 3C and a fourth vehicle system takes the form of brake system 3D. Naturally, vehicle data may also be acquired from other vehicle systems or from another combination of vehicle systems 3 indicated above and recorded.

Event-recognition assembly 30 predetermines start time EZF_1 of present event time window EZF as timestamp in relation to a present zero reference time B, and end time EZF_2 of present event time window EZF as time difference with respect to start time EZF_1. Buffer block 20 redefines present zero reference time B, if necessary.

In the exemplary embodiment shown, data-provision assembly 10 includes a data acquisition 12 and a data pre-processing 14, and transfers reference information 25 of data frames DR stored in the at least one volatile memory 50, to buffer block 20. As already explained above, in the exemplary embodiment shown, reference information 25 of the individual data frames DR includes data-frame pointers DRZ, which a memory location of the data blocks or data frames stored in the volatile memory, as well as corresponding time window 27 of data frame DR with start timestamp 26 and end timestamp 29. In the case of a recognized event, buffer block 20 forwards corresponding reference information 25 of data frames which are to be stored persistently in the at least one non-volatile memory 46, to data-recording assembly 40. In the exemplary embodiment shown, data-recording assembly 40 includes a data post-processing 42, a data storage 44 and the at least one non-volatile memory 46. The individual data frames DR usually contain more than one data segment, which was generated or stored within time window 27 of data frame DR. Buffer block 20 knows only time window 27 of data frame DR and does not know or understand the contents of data frame DR. Buffer block 20 receives and passes on data frames DR as referencing from data-provision assembly 10 to data-recording assembly 40. In other words, buffer block 20 does not copy the memory contents of data frames DR. If event-recognition assembly 30 informs buffer block 20 about a present event time window EZF, buffer block 20 identifies the data frames DR which relate to present event time window EZF. Buffer block 20 then provides to data-recording assembly 40 for data recording, precisely the reference information 25 of data frames DR which overlap in time with present event time window EZF. That means that buffer block 20 passes on the reference information 25 of complete data frames DR to data-recording assembly 40, even if the data frames DR overlap only partially with present event time window EZF, and therefore some data segments may lie outside of present event time window EZF. Buffer block 20 relates only data frames DR to the event that has occurred, which have a time overlap with present event time window EZF. Buffer block 20 uses no further criteria to assign data frames DR to an event. Buffer block 20 supplies to data-recording assembly 40 precisely the reference information 25 of data frames DR which overlap with present event time window EZF. There are no restrictions for the order in which buffer block 20 passes on data frames DR to data-recording assembly 40. In each instance, buffer block 20 processes only one event at one point in time. Event-recognition assembly 30 informs buffer block 20 only about present event time window EZF. Buffer block 20 needs no further information about the conditions or details of the event. If event-recognition assembly 30 identifies a second event while buffer block 20 is already processing a present event time window EZF of a first event, event recognition assembly 30 may change present event time window EZF. In addition, buffer block 20 has a statically configurable limit, that is, a configurable limit known at the time of compilation, which indicates how many units of time at the most a present event time window EZF may begin prior to the present point in time. This limit is referred to as maximum pre-event point in time. Event-recognition assembly 30 cannot change the start of present event time window EZF to a point in time which lies prior in time to the maximum pre-event point in time. In addition, event-recognition assembly 30 may not specify any present event time window EZF whose beginning lies prior in time to the maximum pre-event point in time.

Thus, the behavior of buffer block 20 is indicated by present event time window EZF. If event-recognition assembly 30 recognizes an event for which data must be recorded permanently, then event-recognition assembly 30 informs buffer block 20 about corresponding present event time window EZF which corresponds to a period of time for which corresponding data frames DR are to be stored persistently. The end of present event time window EZF may be a point of time in the future. If further events are recognized, then present event time window EZF may change. For example, this may be the case if, first of all, a less important event is recognized, followed by a more serious event that is regarded as related to the first event. One example could be that as event A, the vehicle recognizes that it is crossing the center line of the road, that is, a fault exists in an automatic steering function of the vehicle, and subsequently an airbag control unit informs event-recognition assembly 30 about an airbag deployment as the result of a frontal impact as event B. Event A alone may be regarded as relevant for a recording of the vehicle data in a first present event time window EZF with a start time EZF_1 which lies 10 seconds prior to the occurrence of event A, and an end time EZF_2 which lies 10 seconds after the occurrence of event A. Event B, which is considerably more serious than event A, may require a recording of the vehicle data in a second present event time window EZF with a start time EZF_1 which lies 30 seconds prior to the occurrence of event B, and an end time EZF_2 which lies 30 seconds after the occurrence of event B. Thus, while the recording of the vehicle data for event A is still in progress, event-recognition assembly 30 changes present event time window EZF for the recording of the vehicle data for event B.

In the exemplary embodiment shown, buffer block 20 viewed from outside corresponds to a collection of pointers DRZ to data frames DR which buffer block 20 keeps temporarily until buffer block 20 either returns them to the memory management of the at least one volatile memory 50, or forwards them to data-recording assembly 40 which reads out data frames DR, corresponding to forwarded pointers DRZ, from the at least one volatile memory 50 and stores them persistently in the at least one non-volatile memory 46. For example, buffer block 20 may mark the present write partition with a write-partition pointer in an atomic machine instruction. Internally, the buffer block includes a series of partitions 21. For instance, a single partition 21 corresponds to an array of data-frame pointers DRZ, which are enriched with some additional information 26 that relates to time window 27 of corresponding data frame DR, and auxiliary information 60 which facilitates and accelerates the read-out operation of reference information 25. Both the size and the number of partitions 21 in buffer block 20 are statically configurable, that is, are known at the time of compiling. Buffer block 20 contains statically the memory area of partitions 21, that is, buffer block 20 assigns partitions 21 statically upon the start of the program. The size and number of partitions 21 may be configured in such a way that the number of data-frame pointers DRZ is sufficient under all conditions. In addition to partitions 21, which contain data-frame pointers DRZ, buffer block 20 contains a materialized representation of present event time window EZF.

Data-provision assembly 10 inserts data frames DR, i.e., reference information 25 of corresponding data frames DR, into buffer block 20, while data-recording assembly 40 reads out reference information 25 of data frames DR from buffer block 20 and stores the associated data frames DR persistently. Therefore, data-provision assembly 10 is referred to here as "writer" and data-recording assembly 40 is referred to as "reader". Writer and reader may invoke procedures of buffer block 20 simultaneously or in parallel from different operational sequences, and the inner state of buffer block 20 naturally remains correct in all possible simultaneous or parallel sequences.

Buffer block 20 separates a write sequence of write function SF from a read sequence of read function LF based on the exclusive possession of partitions 21. Buffer block 20 determines one of partitions 21 as the present "write partition." Write function SF possesses this present write partition exclusively. Read function LF is unable to either read or change the present write partition, even if the present write partition contains data frames DR which overlap present event time window EZF in time. When write function SF has completely filled the present write partition with reference information 25, utilizing the determination process described above, write function SF searches for a new present write partition, and the previous write partition becomes accessible for read function LF.

When write function SF has determined the new present write partition, write function SF resets the write-partition pointer of buffer block 20 according to an atomic memory operation. In this way, race conditions are ruled out, which may be caused because read function LF is accessing an obsolete, temporarily-stored version of the present write partition, e.g., in a CPU cache of another CPU core.

Read function LF likewise possesses a partition 21, which is determined as present read partition. Naturally, the present read partition overlaps in time with present event time window EZF, otherwise read function LF would have no interest in data frames DR included. Because of the determination process described above, without further means for separating the operational sequences, write function SF will never access the present read partition. When read function LF has read out all reference information 25 of relevant data frames DR from the present read partition, then time window 22 of the present read partition is either invalid because all data frames DR contained in the present read partition were read out, or time window 22 of the present read partition no longer overlaps with present event time window EZF. Read function LF then searches for another partition 21 which overlaps with present event time window EZF and is not the present write partition. When read function LF finds such a partition 21, since the buffer block contains reference information 25 of multiple relevant data frames DR with respect to the present event, then read function LF determines this partition 21 for the new present read partition. Since write function SF never accesses the present read partition, it is also not necessary to store the read-partition pointer atomically. In the overwhelming majority of invocations of buffer block 20, write function SF simply adds reference information 25 with respect to a new data frame DR at the end of the present write partition, so that time window 22 of the present write partition is possibly expanded. In the same way, read function LF simply reads out reference information 25 with respect to the next data frame DR from the present read partition. In this way, write function SF and read function LF never interfere with each other. Only when the present write partition is completely written or the present read partition has been completely read out, can there be simultaneous accesses to partitions. However, these are write-protected, read-only accesses, which compare time windows 22 of partitions 21 to each other. The read sequences and write sequences are always properly separated from each other based on the definition of a new exclusive read partition or a new exclusive write partition.

There may be more than one call of write function SF. In order to avoid race conditions owing to two calls which simultaneously want to define a new present write partition or overwrite status information within the present write partition, all accesses to buffer block 20 by a call of write function SF are carried out only with exclusive possession of a lock. In the case of only a single write function SF, this lock is always available in a single atomic read operation. Otherwise, a second call must wait until the write function SF presently active has released this lock. Since the actions carried out under the lock are very fast, this is the better solution than, in contrast to that, to introduce a separate present write partition individually for each call of write function SF. It should be noted that neither read function LF nor event-recognition assembly 30 must ever acquire this lock. In other words, this lock causes only wait states in the event two calls are present to, in each case, simultaneously insert reference information 25 of a new data frame DR into buffer block 20 via write function SF.

The event recognition may be carried out in event-recognition assembly 30 in a separate operational sequence. Event-recognition assembly 30 does not interact directly with the processing of data frames DR. However, event-recognition assembly 30 is able at any time to determine, alter or invalidate the present event time window stored in buffer block 20. Write function SF reads present event time window EZF during the search for a new write partition. Although the simultaneous access of event-recognition assembly 30 and write function SF to the present event time window is "only" a read/write conflict, buffer block 20 ensures that write function SF does not read any partially written and therefore arbitrarily damaged present event time window EZF, while event-recognition assembly 30 is changing present event time window EZF. If there is more than one call of write function SF, only one of them can have acquired the exclusive lock described. Therefore, only one write function SF can be in conflict with event-recognition assembly 30 for the simultaneous access to present event time window EZF, while other calls attempt to obtain the lock. Buffer block 20 resolves the conflict between event-recognition assembly 30 and write function SF by storing present event time window EZF as an atomic value, that is, in a machine instruction. Therefore, event-recognition assembly 30 writes the new present event time window EZF in a single atomic operation. Write function SF reads either the old present event time window EZF or the new present event time window EZF, but never a damaged, partially-written, present event time window EZF.

In the search for a new write partition, write function SF first of all creates a locally-executable copy of present event time window EZF with the aid of an atomic read operation. Write function SF subsequently works only with the locally-executable copy, until a new write partition is found. In this way, it is possible for write function SF to search for a new write partition with the aid of an aged present event time window EZF. However, this behavior is identical to the case where write function SF first of all updates the write partition, and after that, event-recognition assembly 30 changes present event time window EZF.

As in the case of the read/write conflict between event-recognition assembly 30 and write function SF described, read function LF also has a read/write conflict with event-recognition assembly 30 for accesses to present event time window EZF of buffer block 20. Read function LF must be familiar with present event time window EZF in order to find a partition 21 which contains data frames DR that overlap with present event time window EZF, and if this partition 21 is not contained completely in present event time window EZF, to identify or determine the relevant data frames DR within this partition. Naturally, read function LF reads no partially written, damaged, present event time window EZF, while event-recognition assembly 30 is simultaneously changing present event time window EZF.

As explained above, event-recognition assembly 30 updates present event time window EZF atomically. Read function LF likewise reads present event time window EZF atomically at the beginning of each process call of buffer block 20 and stores it in a locally-executable copy. During the execution of the read-out operation, read function LF uses this copy wherever present event time window EZF is needed.

It is possible that present event time window EZF stored in buffer block 20 may differ from the locally-executable copy of read function LF. Read function LF ends the present read-out operation with present event time window EZF that in the meantime has become antiquated, and thus at most forwards reference information 25 of one data frame DR whose time window 22 is outside of present event time window EZF, to data-recording assembly 40. However, this behavior is as though event-recognition assembly 30 had first determined new present event time window EZF after read function LF had processed this data frame DR, and is therefore tolerable.

At the beginning of each call of buffer block 20, read function LF not only creates a locally-executable copy of present event time window EZF, but also checks whether present event time window EZF has changed since the previous call. If present event time window EZF has changed, read function LF first of all checks whether the present read partition still overlaps with the new present event time window. If this is not the case, read function LF searches for a new present read partition, as described above. If the present read partition still overlaps with new present event time window EZF, read function LF starts the read-out operation again and begins once more to read the present read partition from the beginning.

What is claimed is:

1. A method for recording event data in a vehicle, the method comprising the following steps:
   receiving continuously from at least one vehicle system vehicle data;
   writing the received vehicle data as event data in individual data frames of a predetermined size, the individual data frames being stored in at least one volatile memory;
   managing and keeping available the stored data frames in the at least one volatile memory until the event data stored in the individual data frames is older than a predetermined maximum pre-event point in time, or is stored persistently in at least one non-volatile memory in reaction to a recognized predetermined event;
   providing at least one partition of a predetermined size into which received reference information of the individual data frames is written in any time sequence;
   ascertaining and marking temporally randomly-sorted subsequences of the written reference information of the individual data frames in the at least one partition;
   wherein the reference information of each individual data frame of the individual data frames includes a corresponding memory area, and a corresponding time window with a start timestamp and an end timestamp of the individual data frame, in which at least one data segment of the event data contained in the individual data frame was generated or acquired,
   wherein a time window is assigned to each partition of the at least one partition, an oldest start timestamp of the reference information of a corresponding one of the individual data frames contained in the partition being used as a start timestamp of the time window of the partition, and a latest end timestamp of the reference information of a corresponding one of the individual data frames contained in the partition is used as end timestamp of the time window of the partition;
   wherein: (i) start-time subsequences of the temporarily randomly sorted subsequences are marked based on the start timestamps of the individual data frames contained in each partition and/or (ii) end-time subsequences of the temporarily randomly sorted sequences are marked based on the end timestamp of the individual data frames contained in each partition;
   based on recognizing a predetermined event, determining which of the individual data frames to persistently store in at least one non-volatile memory based on a time window associated with the predetermined event, the time window of each overlapping partition of the at least one partition whose time window at least one overlaps with the time window associated with the predetermined event, and: (i) the marked start-time subsequences in the overlapping partition and/or (ii) the marked end-time subsequences in the overlapping partition; and
   persistently storing in the at least one non-volatile memory the determined individual data frames.

2. The method as recited in claim 1, wherein a start time of the present event time window associated with the predetermined event is predetermined as a timestamp in relation to a present zero reference time, and an end time of the present event time window associated with the predetermined event is predetermined as a time difference with respect to the start time, wherein the present zero reference time is redefined, when necessary.

3. The method as recited in claim 2, wherein an oldest zero reference time corresponds to a start time of the vehicle.

4. The method as recited in claim 2, wherein the present zero reference time is redefined when a new present event time window is not able to be represented with the present zero reference time, because a start time of the new present event time window is too distant in time from the present zero reference time.

5. The method as recited in claim 1, wherein the start timestamp and the end timestamp each of the individual data frames are related to the present zero reference time.

6. The method as recited in claim 1, wherein the reference information of at least one of the individual data frames whose time window overlaps with the present event time window associated with predetermined event is read out from each partition whose time window overlaps with the window associated with the predetermined event, the time window of the at least one of the individual data frames whose reference information was read out being made invalid in the reference information of the at least one of the individual data frames after the read-out.

7. The method as recited in claim 1, wherein the written reference information of the individual data frames is numbered consecutively in ascending order according to its write sequence.

8. The method as recited in claim 7, wherein upon each writing of the reference information of a new data frame, a time window of the new data frame is compared to the time window of the individual data frame whose reference information was written last into the partition.

9. The method as recited in claim 8, wherein a start timestamp of the new data frame is compared to the start timestamp of the last-written data frame, a temporally randomly-sorted present start-time subsequence being recognized and continued when the start timestamp of the new data frame is later than the start timestamp of the last-written data frame, or a new start-time subsequence is started and its start timestamp being marked by storing the corresponding numbering of the new data frame when the start timestamp of the new data frame is older than the start timestamp of the last-written data frame, and a first start-time subsequence starts with the start timestamp of a first-written data frame.

10. The method as recited in claim 9, wherein an end timestamp of the new data frame is compared to the end timestamp of the last-written data frame, a temporally randomly-sorted present end-time subsequence being recognized and continued when the end timestamp of the new data frame is later than the end timestamp of the last-written data frame, or a new end-time subsequence is started and its end timestamp being marked by storing the corresponding numbering of the new data frame when the end timestamp of the new data frame is older than the end timestamp of the last-written data frame, and a first end-time subsequence starts with the end timestamp of the first-written data frame.

11. The method as recited in claim 10, wherein the reference information of at least one of the individual data frames to be read out from each partition whose time window overlaps with the time window associated with the predetermined event, and potentially persistently stored in the at least one non-volatile memory is ascertained as a function of a temporal relation of the at least one temporally randomly-sorted start-time subsequence and/or the at least one temporally randomly-sorted end-time subsequence of the present read partition, to the present event time window of the predetermined event.

12. The method as recited in claim 11, wherein to ascertain reference information of individual data frames to be read out from each partition whose time window overlaps with the time window associated with the predetermined event, the end timestamps of the marked, temporally randomly-sorted end-time subsequences are compared to the start time of the present event time window, when a start timestamp of the time window of the partition lies outside of the present event time window associated with the predetermined event and an end timestamp of the time window of the partition lies within the present event time window associated with the predetermined event.

13. The method as recited in claim 11, wherein the reference information of at least one of the individual data frames in the partition is skipped from being read out when the time window of from at least one of the partition lies completely within the present event time window partitions whose time window at least partially overlaps the time window associated with the predetermined event.

14. The method as recited in claim 11, wherein, to ascertain reference information of the individual data frames to be read out from the at least one each partition whose time window at least partially overlaps with the time window associated with the predetermined event, the start timestamps of the marked, temporally randomly-sorted start-time subsequences are compared to an end time of the present event time window associated with the predetermined event, when a start timestamp of a time window of the partition lies within the present event time window associated with the predetermined event and an end timestamp of the time window of the at least one partition lies outside of the present event time window associated with the predetermined event.

15. The method as recited in claim 11, wherein, to ascertain reference information of the individual data frames to be read out from the at least one each partition whose time window at least partially overlaps with the time window associated with the predetermined event, the start timestamps of the marked, temporally randomly-sorted start-time subsequences are in each case compared to an end time of the present event time window associated with the predetermined event, and the end timestamps of the marked, temporally randomly-sorted end-time subsequences are in each case compared to a start time of the present event time window associated with the predetermined event, when a start timestamp of a time window of the partition is older than the start time of the present event time window associated with the predetermined event and an end timestamp of the time window of the partition is later than the end time of the present event time window associated with the predetermined event.

16. The method as recited in claim 1, wherein multiple partitions of a predetermined size are provided, one of the multiple partitions being determined as a present write partition, into which the received reference information of the individual data frames is written, as a function of the at least one write criterion.

17. The method as recited in claim 16, wherein in reaction to a request and as a function of at least one predetermined read criterion, one of the other partitions is determined as a present read partition, from which the reference information of the individual data frames of the one of the other partitions is read out and passed on for persistent storage in the at least one non-volatile memory.

18. The method as recited in claim 17, wherein prior to determining the present read partition, an existing present event time window is stored locally, the locally-stored present event time window being compared to the present event time window before each read-out operation of the reference information of at least one of the individual data frames, and the present event time window of the predetermined event being stored locally if it differs from the locally-stored event time window, it being checked whether a time window of the present read partition and the new present event time window overlap, when the locally-stored present event time window was changed, and the read-out operation of the read partition being restarted when the present read partition overlaps with the changed present event time window, or a new present read partition being determined if the present read partition does not overlap with the changed present event time window.

19. The method as recited in claim 16, wherein as a function of the at least one predetermined write criterion, a new write partition is sought when the vehicle is restarted or the present write partition is completely written with the reference information of the individual data frames.

20. The method as recited in claim 19, wherein a set of partitions is determined which have no valid time window or have a valid time window that is completely older than a maximum pre-event point in time and does not overlap an existing present event time window, and, from the set of partitions, one partition which has no valid time window or one partition whose corresponding valid time window has an oldest start timestamp being determined as present write partition.

21. The method as recited in claim 1, wherein in the determining of which of the individual data frames to persistently store in the at least one non-volatile memory, the reference information of at least one of the individual frames of at least one partitions whose time window at least partially overlaps the time window associated with the predetermined event is not read out and the at least one data frame is not persistently stored.

22. A device for carrying out the method for recording event data in a vehicle, comprising:
a data-provision assembly;
a buffer block;
an event-recognition assembly; and
a data-recording assembly;
wherein the data-provision assembly is configured to continuously receive vehicle data to be recorded from at least one vehicle system and to write it as event data in individual data frames of a predetermined size and to store the individual data frames in at least one volatile memory;
wherein the buffer block is configured to manage the stored individual data frames and to keep the stored individual data frames available in the at least one volatile memory until the event data stored in the individual data frames is older than a predetermined maximum pre-event point in time, or is stored persistently in at least one non-volatile memory in reaction to a predetermined event recognized by the event-recognition assembly, the buffer block including a write function and at least one partition of a predetermined size, the write function being configured to write received reference information of the individual data frames in any time sequence into the partition and to ascertain and mark temporally randomly-sorted subsequences of the written the reference information of the individual data frames in the partition;
wherein the reference information of each individual data frame of the individual data frames includes a corresponding memory area, and a corresponding time window with a start timestamp and an end timestamp of the individual data frame, in which at least one data segment of the event data contained in the individual data frame was generated or acquired,
wherein a time window is assigned to each partition of the at least one partition, an oldest start timestamp of the reference information of a corresponding one of the individual data frames contained in the partition being used as a start timestamp of the time window of the partition, and a latest end timestamp of the reference information of a corresponding one of the individual data frames contained in the partition is used as end timestamp of the time window of the partition;
wherein: (i) start-time subsequences of the temporarily randomly sorted subsequences are marked based on the start timestamps of the individual data frames contained in each partition and/or (ii) end-time subsequences of the temporarily randomly sorted sequences are marked based on the end timestamp of the individual data frames contained in each partition;
based on the event-recognition assembly recognizing a predetermined event, the buffer block determines which of the individual data frames to persistently store in the at least one non-volatile memory based on a time window associated with the predetermined event, the time window of each overlapping partition of the at least one partition whose time window at least one overlaps with the time window associated with the predetermined event, and: (i) the marked start-time subsequences in the overlapping partition and/or (ii) the marked end-time subsequences in the overlapping partition; and
the data recording assembly stores in the at least one non-volatile memory the determined individual data frames.

23. The device as recited in claim 22, wherein the event-recognition assembly is configured to continually monitor a state of the vehicle and to decide when the predetermined event has occurred which requires persistent storage of corresponding event data of the at least one vehicle system, the event-recognition assembly further being configured to output to the buffer block a present event the time window that corresponds to associated with the predetermined event and for which the event data is to be recorded persistently, a start time of the present event time window associated with the predetermined event not being prior in time to a maximum pre-event point in time.

24. The device as recited in claim 23, wherein the event-recognition assembly is further configured to predetermine the start time of the present event time window associated with the predetermined event as a timestamp in relation to a present zero reference time, and to predetermine an end time of the present event time window associated with the predetermined event as a time difference with respect to the start time, the buffer block being configured to redefine the present zero reference time, when necessary.

25. The device as recited in claim 22, wherein in the determination of which of the individual data frames to persistently store in the at least one non-volatile memory, the reference information of at least one of the individual frames of at least one partitions whose time window at least partially overlaps the time window associated with the predetermined event, is not read out and the at least one data frame is not persistently stored.

26. A non-transitory machine-readable storage medium on which is stored a computer-program for recording event data in a vehicle, the computer program, when executed by a computer, causing the computer to perform the following steps:
receiving continuously from at least one vehicle system vehicle data;
writing the received vehicle data as event data in individual data frames of a predetermined size, the individual data frames being stored in at least one volatile memory;
managing and keeping available the stored data frames in the at least one volatile memory until the event data stored in the individual data frames is older than a predetermined maximum pre-event point in time, or is stored persistently in at least one non-volatile memory in reaction to a recognized predetermined event;
providing at least one partition of a predetermined size into which received reference information of the individual data frames is written in any time sequence;
ascertaining and marking temporally randomly-sorted subsequences of the written reference information of the individual data frames in the at least one partition;
wherein the reference information of each individual data frame of the individual data frames includes a corresponding memory area, and a corresponding time window with a start timestamp and an end timestamp of the individual data frame, in which at least one data segment of the event data contained in the individual data frame was generated or acquired,
wherein a time window is assigned to each partition of the at least one partition, an oldest start timestamp of the reference information of a corresponding one of the individual data frames contained in the partition being used as a start timestamp of the time window of the partition, and a latest end timestamp of the reference information of a corresponding one of the individual data frames contained in the partition is used as end timestamp of the time window of the partition;

wherein: (i) start-time subsequences of the temporarily randomly sorted subsequences are marked based on the start timestamps of the individual data frames contained in each partition and/or (ii) end-time subsequences of the temporarily randomly sorted sequences are marked based on the end timestamp of the individual data frames contained in each partition;

based on recognizing a predetermined event, determining which of the individual data frames to persistently store in at least one non-volatile memory based on a time window associated with the predetermined event, the time window of each overlapping partition of the at least one partition whose time window at least one overlaps with the time window associated with the predetermined event, and: (i) the marked start-time subsequences in the overlapping partition and/or (ii) the marked end-time subsequences in the overlapping partition; and persistently storing in the at least one non-volatile memory the determined individual data frames.

27. The non-transitory machine-readable storage medium in claim 26, wherein in the determining of which of the individual data frames to persistently store in the at least one non-volatile memory, the reference information of at least one of the individual frames of at least one partitions whose time window at least partially overlaps the time window associated with the predetermined event is not read out and the at least one data frame is not persistently stored.

* * * * *